United States Patent [19]

Brown et al.

[11] Patent Number: 4,493,902

[45] Date of Patent: Jan. 15, 1985

[54] FLUID CATALYTIC CRACKING CATALYST COMPRISING MICROSPHERES CONTAINING MORE THAN ABOUT 40 PERCENT BY WEIGHT Y-FAUJASITE AND METHODS FOR MAKING

[75] Inventors: Stanley M. Brown, Scotch Plains; Vincent A. Durante, East Brunswick; William J. Reagan, Englishtown; Barry K. Speronello, River Edge, all of N.J.

[73] Assignee: Engelhard Corporation, Iselin, N.J.

[21] Appl. No.: 469,765

[22] Filed: Feb. 25, 1983

[51] Int. Cl.$^3$ .................... B01J 21/16; B01J 29/08
[52] U.S. Cl. ........................ 502/65; 502/68; 502/72; 423/328
[58] Field of Search ............. 502/8, 68, 72, 65; 423/328

[56] References Cited

U.S. PATENT DOCUMENTS

| | | |
|---|---|---|
| 3,119,659 | 1/1964 | Taggart et al. .................. 23/112 |
| 3,119,660 | 1/1964 | Howell et al. .................. 23/112 |
| 3,140,249 | 7/1964 | Plank et al. ................... 208/120 |
| 3,321,272 | 5/1967 | Kerr ........................... 23/113 |
| 3,338,672 | 8/1967 | Haden et al. ................... 23/112 |
| 3,367,886 | 2/1968 | Haden et al. ................... 252/455 |
| 3,367,887 | 2/1968 | Haden et al. ................... 252/455 |
| 3,390,958 | 7/1968 | Howell ......................... 23/112 |
| 3,391,994 | 7/1968 | Haden et al. ................... 23/112 |
| 3,393,156 | 7/1968 | Hansford ....................... 252/455 |
| 3,433,587 | 3/1969 | Haden et al. ................... 23/112 |
| 3,433,589 | 3/1969 | Ciric et al. ................... 23/113 |
| 3,458,454 | 7/1969 | Lapides et al. ................. 252/455 |
| 3,472,617 | 10/1969 | McDaniel et al. ............... 23/112 |
| 3,492,090 | 1/1970 | Jenkins ........................ 23/113 |
| 3,503,900 | 3/1970 | Haden et al. ................... 252/455 |
| 3,506,594 | 4/1970 | Haden et al. ................... 252/455 |
| 3,507,778 | 4/1970 | Gladrow et al. ................. 208/111 |
| 3,515,511 | 6/1970 | Flank .......................... 23/112 |
| 3,515,683 | 6/1970 | Flank et al. ................... 252/455 |
| 3,592,760 | 7/1971 | Young .......................... 208/111 |
| 3,595,611 | 7/1971 | McDaniel et al. ................ 23/111 |
| 3,639,099 | 2/1972 | Elliott et al. ................. 23/112 |
| 3,642,662 | 2/1972 | Macarus et al. ................. 252/455 Z |
| 3,647,718 | 3/1972 | Haden, Jr. et al. .............. 502/68 |
| 3,657,154 | 4/1972 | Haden et al. ................... 252/455 Z |
| 3,663,165 | 5/1972 | Haden et al. ................... 23/112 |
| 3,674,538 | 4/1971 | McDaniel et al. ................ 23/112 |
| 3,733,391 | 5/1973 | Hoffman ........................ 423/118 |
| 3,752,772 | 8/1973 | Horzepa ........................ 502/72 |
| 3,777,006 | 12/1973 | Rundell et al. ................. 423/118 |

(List continued on next page.)

FOREIGN PATENT DOCUMENTS

| | | |
|---|---|---|
| 1271450 | 4/1972 | United Kingdom . |
| 1342977 | 1/1974 | United Kingdom . |
| 990708 | 6/1976 | Canada . |
| 591088 | 1/1984 | Japan . |

OTHER PUBLICATIONS

Howden, Control of the Concentration of NaY Zeolite Synthesized in Fired Kaolinite Microspheres, (CSIR Report CENG 262, Sep. 1978).

Brown, U.S. patent application Ser. No. 191,641, filed Sep. 26, 1980, and now abandoned.

Brown et al., U.S. patent application Ser. No. 70,890, filed Aug. 29, 1979, and now abandoned.

Breck, Zeolite Molecular Sieves, pp. 313-322, 371-378, (1974).

European Patent Application Publication No. 0043358, (Jun. 1, 1982).

Oblad, Molecular Sieve Cracking Catalysts, The Oil and Gas Journal, 70, 84, (Mar. 27, 1972).

*Primary Examiner*—Carl F. Dees
*Attorney, Agent, or Firm*—Richard M. Barnes

[57] ABSTRACT

This application discloses novel fluid catalytic cracking catalysts comprising microspheres containing more than about 40%, preferably 50-70%, by weight Y-faujasite zeolite, methods for making such catalysts, and the use of such catalysts to crack petroleum feedstocks, particularly those containing large amounts of contaminant metals. The microspheres of the catalyst of the invention are characterized by a combination of desirable catalytic and physical characteristics, including exceptionally high activity, excellent hydrothermal stability, good to excellent attrition resistance, and desirable selectivity characteristics.

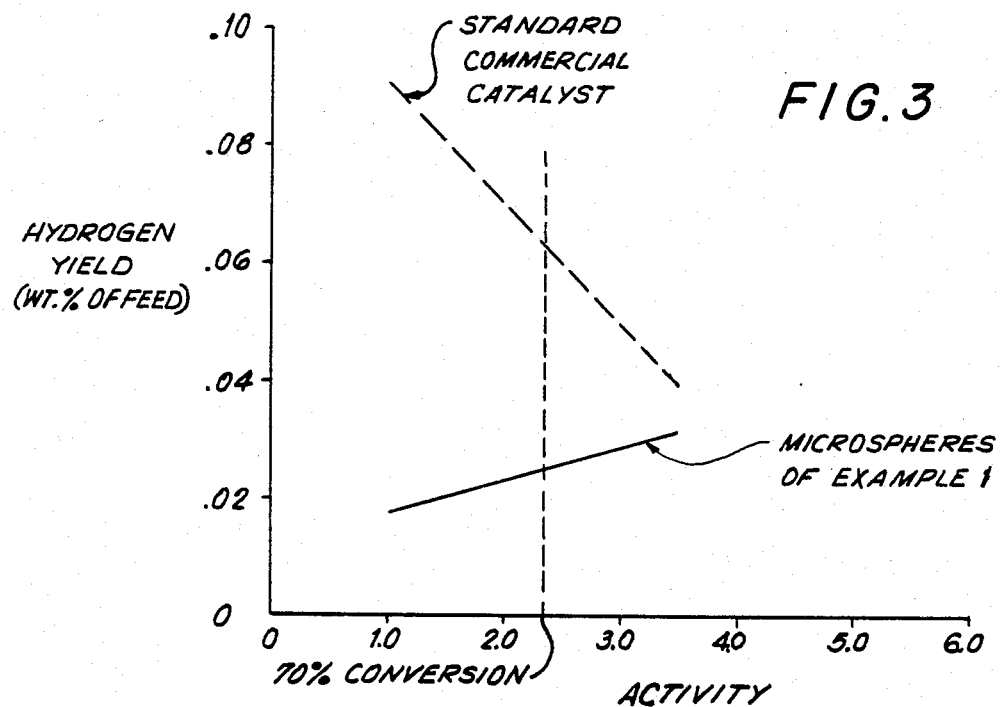
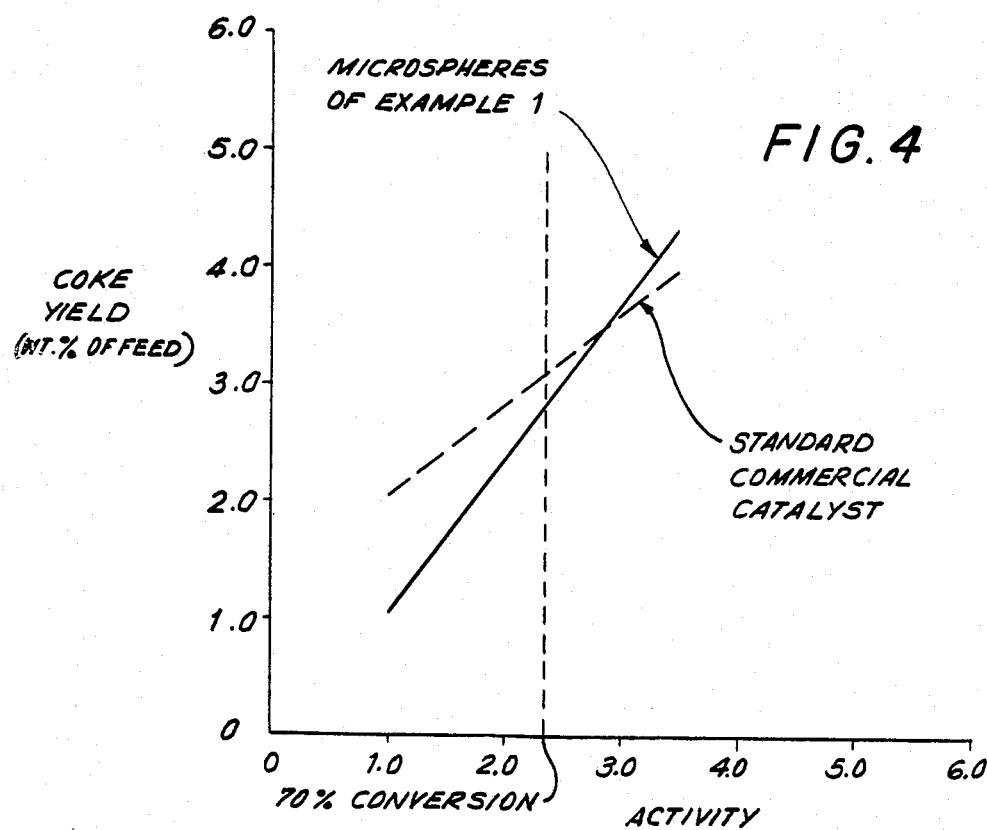

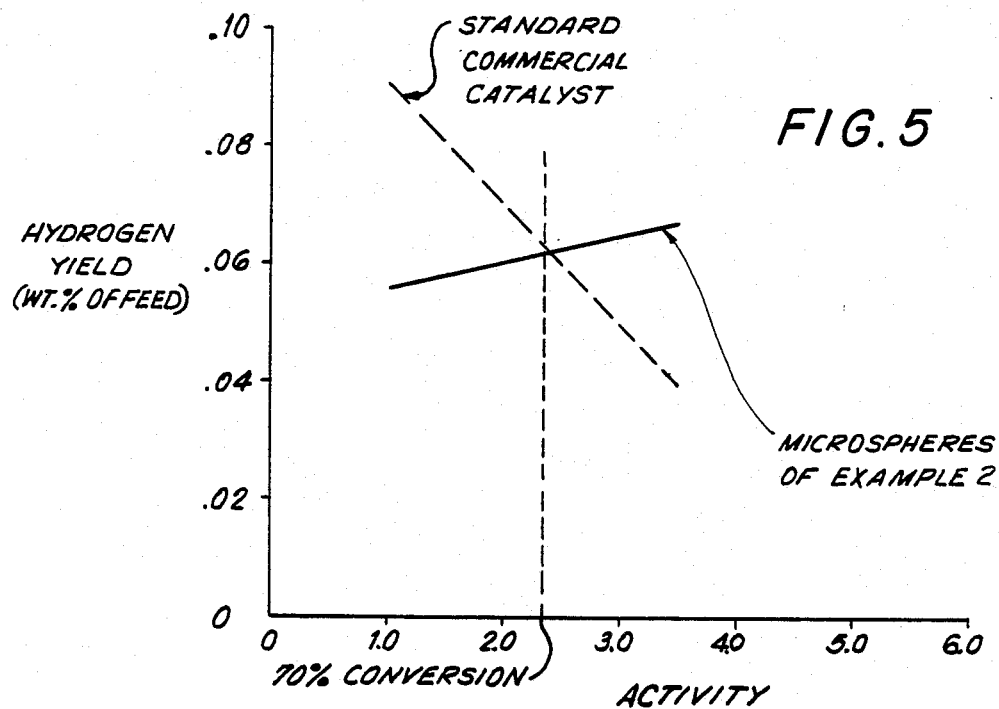
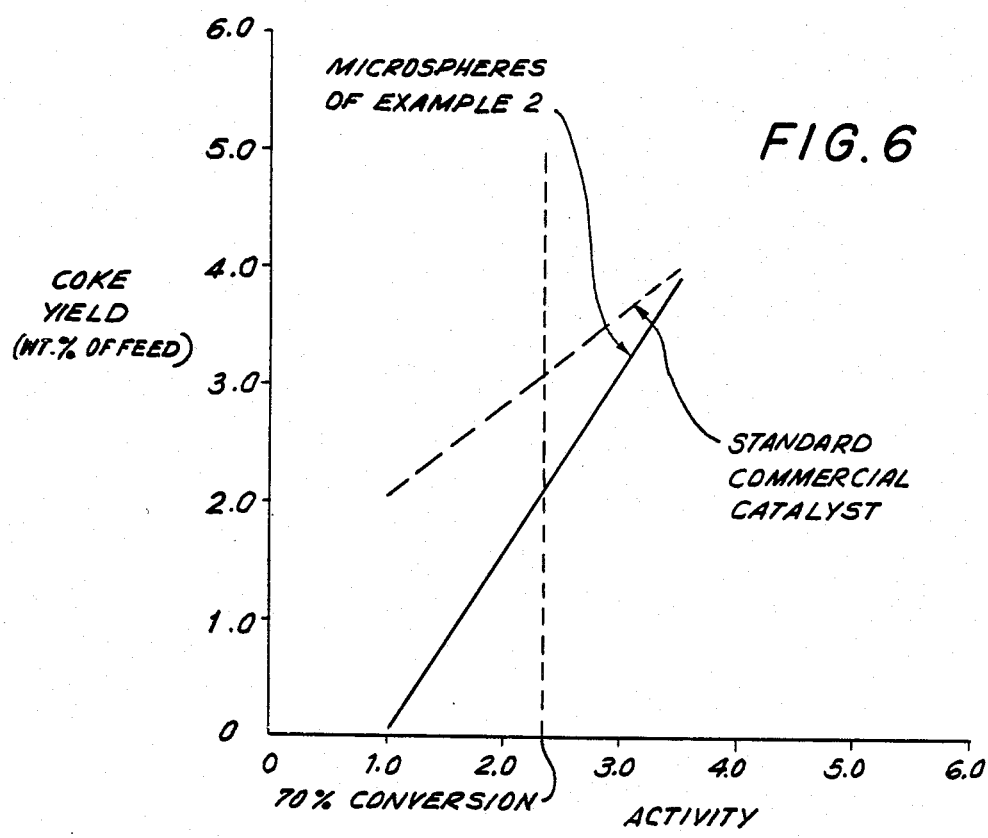

FLUID CATALYTIC CRACKING CATALYST COMPRISING MICROSPHERES CONTAINING MORE THAN ABOUT 40 PERCENT BY WEIGHT Y-FAUJASITE AND METHODS FOR MAKING

BACKGROUND OF THE INVENTION

The present invention relates to novel fluid catalytic cracking catalysts comprising microspheres containing more than about 40% by weight Y-faujasite zeolite and having exceptionally high activity and other desirable characteristics, methods for making such catalysts and the use of such catalysts for cracking petroleum feedstocks, particularly those containing large amounts of contaminant metals.

Since the 1960's, most commercial fluid catalytic cracking catalysts have contained zeolites as an active component. Such catalysts have taken the form of small particles, called microspheres, containing both an active zeolitic component and a non-zeolitic component. Frequently, the non-zeolitic component is referred to as the matrix for the zeolitic component of the catalyst. The non-zeolitic component is known to perform a number of important functions, relating to both the catalytic and physical properties of the catalyst. Oblad described those functions as follows:

"The matrix is said to act as a sink for sodium in the sieve thus adding stability to the zeolite particles in the matrix catalyst. The matrix serves the additional function of: diluting the zeolite; stabilizing it towards heat and steam and mechanical attrition; providing high porosity so that the zeolite can be used to its maximum capacity and regeneration can be made easy; and finally it provides the bulk properties that are important for heat transfer during regeneration and cracking and heat storage in large-scale catalytic cracking." A. G. Oblad, Molecular Sieve Cracking Catalysts, The Oil And Gas Journal, 70, 84 (March 27, 1972).

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves tp provide microspheres containing both zeolitic and non-zeolitic components.

It has long been recognized that for a fluid catalytic cracking catalyst to be commercially successful, it must have commercially acceptable activity, selectivity, and stability characteristics. It must be sufficiently active to give economically attractive yields, it must have good selectivity towards producing products that are desired and not producing products that are not desired, and it must be sufficiently hydrothermally stable and attrition resistant to have a commercially useful life.

Two products that are particularly undesirable in commercial catalytic cracking processes are coke and hydrogen. Even small increases in the yields of these products relative to the yield of gasoline can cause significant practical problems. For example, increases in the amount of coke produced can cause undesirable increases in the heat that is generated by burning off the coke during the highly exothermic regeneration of the catalyst. In addition, in commercial refineries, expensive compressors are used to handle high volume gases, such as hydrogen. Increases in the volume of hydrogen produced, therefore, can add substantially to the capital expense of the refinery.

A significant limitation of zeolite fluid catalytic cracking catalysts is the tendency of such catalysts (a) to be deactivated rapidly in the presence of metal contaminants often found in petroleum feedstocks, particularly vanadium, and (b) to function as a support for contaminant metals, particularly nickel and vanadium, which produce excessive amounts of dehydrogenation reaction products, i.e., coke and hydrogen. Because of these limitations and increased concern about the world's diminishing supply of petroleum, particularly petroleum with only small amounts of metal contaminants, in recent years substantial efforts have been made to develop improved zeolitic cracking catalysts useful for cracking petroleum feedstocks containing relatively large amounts of vanadium and nickel.

A phenomenon that has inhibited the development of zeolitic catalysts having improved activity, stability, and selectivity characteristics is that frequently the improvement in one of those characteristics is accompanied by adverse consequences to one or more of the other characteristics or by other adverse consequences which make the process for making the catalyst economically unattractive. A practical effect of this phenomenon is that generally compromises must be made regarding conflicting catalytic and physical characteristics of the catalyst. For example, U.S. Pat. No. 4,326,993 states that "[i]n general, for a given type of catalyst, attrition resistance increases with . . . decreasing pore volume." The '993 patent goes on to state, however, that "while low pore volumes are desirable, too low a pore volume can lead to selectivity losses due to diffusional restrictions. Desirable values are therefore a compromise" ('993 patent, col. 4, lines 54–59).

To the best of our knowledge, there has been no commercial fluid catalytic cracking catalyst comprising microspheres containing more than about 35% by weight Y-faujasite and less than about 65% by weight of a nonzeolitic component. The reason for this is that it is difficult to increase the Y-faujasite content of microspheres of fluid catalytic cracking catalysts past about 35%, or decrease the non-zeolitic component of the microspheres below about 65%, by a commercially practicable process without adversely affecting one or more of the microsphere's activity, selectivity, hydrothermal stability and attrition resistance characteristics to such an extent as to make the microspheres commercially unattractive.

SUMMARY OF INVENTION

The present invention is directed to a fluid catalytic cracking catalyst comprising microspheres containing at least about 40%, preferably about 50–70%, by weight Y-faujasite zeolite and having a micropore volume (volume of pores having diameters in the range of 20–100Å) of less than about 0.20 cc/g., preferably less than about 0.15 cc/g. The microspheres are characterized by exceptionally high activity and, in the most preferred embodiments, an attrition resistance better than or comparable to currently available commercial catalysts. In addition, the microspheres have good to excellent hydrothermal stability and will provide good yields of gasoline and low yields of coke and hydrogen. We believe the microspheres will exhibit these characteristics even when they are used to crack petroleum feedstocks containing relatively large amounts of contaminant metals.

We have discovered that a catalyst comprising microspheres having all these desirable characteristics can be obtained by (a) crystallizing more than about 40% by weight Y-faujasite zeolite, under conditions that will be described below, in microspheres derived from a mixture of metakaolin clay and kaolin clay that has been calcined at least substantially through its characteristic exotherm, and (b) ion exchanging the resulting microspheres to replace the sodium cations in the microspheres with more desirable cations by procedures described below. We believe that the microspheres of the present invention, which contain a relatively low percentage of non-zeolitic component and which have superior catalytic and physical characteristics, represent a significant advance in the art.

Preferably, the microspheres in which the zeolite is crystallized comprise, before the crystallization reaction, about 30-60% by weight metakaolin clay and about 40-70% by weight kaolin clay that has been calcined at least substantially through its characteristic exotherm. The microspheres contain no hydrous clay or at most less than about 10% by weight of hydrous clay. During the crystallization process, we believe that some of the alumina and silica of the clay microspheres is leached from those microspheres, leaving a non-zeolitic component. This non-zeolitic component is referred to herein as the "zeolite crystallization process residue of calcined clay".

Tests show that the microspheres containing greater than about 40% by weight Y-faujasite of the present invention have a substantially higher activity than any other commercial fluid catalytic cracking catalyst of which we are aware. Except as otherwise noted, these tests were conducted using the procedure described in the ASTM standard method of testing titled "Fluid Cracking Catalysts By Microactivity Test" (Designation D 3907-80) (hereinafter the "ASTM standard procedure"). In these tests, catalytic activity was calculated by first determining "measured conversion" in accordance with the procedure described in the ASTM standard procedure and using the gas oil feed described below and then calculating activity according to the formula: activity = % measured conversion/(100-% measured conversion). Unless otherwise noted, all conversion values, as well as all coke and hydrogen yield values, reported herein were determined on a weight percent of gas oil feed basis.

The standard gas oil feed that was used in these tests was similar to, but not identical to, the ASTM standard feed referred to in the ASTM standard procedure. We have been unable to acquire an adequate amount of the ASTM standard feed. Samples of the standard gas oil feed we used can be obtained for testing purposes by writing to: Director of Patents, Minerals and Chemicals Division, Engelhard Corporation, Edison, New Jersey 08818 (hereinafter Engelhard's Minerals and Chemicals Division Patent Department).

In order to simulate the deactivation experienced by a cracking catalyst in a fluid catalytic cracking unit, catalysts may be hydrothermally deactivated by treating them with steam at high temperatures. The ASTM does not have a standard procedure for hydrothermally deactivating catalysts by treating them with steam. We understand that the ASTM is currently considering a proposal regarding a standard steaming procedure, but that approval for such a standard is not expected in the near future. The steaming procedures used for the purposes of describing and defining the present invention are described in "Engelhard Procedure For The Hydrothermal Deactivation Of Fluid Catalytic Cracking Catalysts" (hereinafter the "hydrothermal deactivation procedure"). This publication has been deposited at the Library of The Technical Information Center, Engelhard Corporation, Edison, New Jersey 08818 (Dewey Decimal Number 665.533 EC/H). Access to this Library, including this publication, can be obtained by writing or telephoning to the Manager of The Technical Information Center. In addition, a copy of this publication can be obtained by writing to Engelhard's Minerals and Chemicals Division Patent Department.

The foregoing publication describes two procedures for the hydrothermal deactivation treatment of catalysts. The procedure described in the main body of the publication is an "open system" procedure in which a small amount of material is exhausted from the hydrothermal treatment unit directly into the atmosphere. The procedure described in Appendix A of the publication is a "closed system" procedure in which material exhausted from the hydrothermal treatment unit is collected and contained in a scrubbing system. Except where otherwise noted, the hydrothermal deactivation procedure used for the purposes of this application was the open system procedure.

The catalytic activity of a catalyst that has been hydrothermally deactivated by treating it with steam for four hours at 1450° F., in accordance with the hydrothermal deactivation procedure, is referred to herein as the "deactivated activity" of the catalyst. The catalytic activity of a catalyst that has been hydrothermally deactivated by treating it with 100% steam for four hours at 1500° F., in accordance with the same procedure, is referred to herein as the "severely deactivated activity" of the catalyst. Unless otherwise noted, all "catalytic activities" and "activities" referred to in this application were determined using the ASTM standard procedure and the standard gas oil feed referred to above.

In the specification and claims, we have defined the catalytic and physical characteristics of the microspheres of the present invention in relation to the characteristics of a sample of a commercially available product, Ultrasiv ® 260 catalyst, small amounts of which can be obtained for testing purposes by writing to Engelhard's Minerals and Chemicals Division Patent Department. Hereinafter, this sample of Ultrasiv ® 260 catalyst is referred to in this application (including the claims) as "standard commercial catalyst."

We believe that defining the catalytic and physical characteristics of the microspheres of the present invention in relation to a standard commercial catalyst, rather than in absolute numerical values, is a more precise way of defining those characteristics. The reason for this is that the numerical values of those characteristics will vary, depending on the operator who conducted the tests and the laboratory equipment the operator used, while the relative values of those characteristics as compared to a standard will remain relatively constant even when those relative values are determined by different operators using different laborator equipment.

When the microspheres of the present invention contain more than about 4% by weight rare earth oxides, they have excellent hydrothermal stability. In particular, their deactivated and severely deactivated activities are at least about 1.5 times greater than, and preferably at least about 2.0 times greater than, that of standard commercial catalyst.

Analyses of the products obtained during the ASTM standard procedure described above show that the catalyst of the present invention has good to excellent selectivity characteristics. In particular, the preferred microspheres of the catalyst of the present invention, when they are steam deactivated to provide about 70% measured conversion in the ASTM standard procedure, yield no more than about the amount of coke and most preferably at least about 20% less coke, and no more than about the amount of hydrogen and most preferably at least about 25% less hydrogen, than does standard commercial catalyst which has also been steam deactivated to provide about 70% measured conversion. In the same tests, microspheres of the present invention having a micropore volume of less than about 0.05 cc/g. typically yield somewhat less light cycle oil at 70% measured conversion than does standard commercial catalyst. The procedures by which coke and hydrogen yields at 70% measured conversion may be determined are described in Example 1 below. Hereinafter, hydrogen and coke yields at "70% measured conversion" are referred to as hydrogen and coke yields at "70% conversion".

The activity and selectivity characteristics of the microspheres of the catalyst of the present invention are achieved even though, in some cases, the microspheres have relatively low total porosity, as compared to fluid catalytic cracking catalysts currently on the market. In particular, the microspheres of the present invention, in some cases, have a total porosity of less than about 0.15 cc/g. or even less than about 0.10 cc/g. In comparison, we are unaware of any fluid catalytic cracking catalyst currently on the market that has a total porosity of less than 0.20 cc/g. As used herein, "total porosity" means the volume of pores having diameters in the range of 35–20,000Å, as determined by the mercury porosimetry technique described below.

We believe that it is surprising that microspheres having a total porosity of less than about 0.15 cc/g. exhibit the activity and selectivity characteristics of the microspheres of the present invention. For example, such a result is contrary to the prior art disclosure discussed above that low pore volumes "can lead to selectivity losses due to diffusional restrictions."

The microspheres of the catalysts of the present invention also exhibit good hydrothermal stability in the presence of vanadium and nickel. For example, when the microspheres have about 4000 parts per million by weight (ppm) of vanadium and about 2000 ppm of nickel deposited on them they exhibit a deactivated activity at least about equal to, and preferably at least about 1.5 times greater than, standard commercial catalyst that has the same amounts of vanadium and nickel deposited on it. As used herein, "about 4000 ppm vanadium" shall include 4000±400 ppm vanadium and "about 2000 ppm nickel" shall include 2000±200 ppm nickel. Our procedure for depositing vanadium and nickel on catalysts is described in Example 1 below.

In addition to having good hydrothermal stability characteristics in the presence of nickel and vanadium, we believe the microspheres of the present invention exhibit good selectivity characteristics in the presence of those metals. Because of all of its desirable characteristics, we believe the microspheres of the catalyst of the present invention will be particularly useful for cracking petroleum feedstocks containing more than about 2 ppm nickel and more than about 2 ppm vanadium, for example metals contaminated heavy oil feed stocks.

The microspheres of the catalyst of the present invention exhibit from good to excellent attrition resistance. In particular, the Engelhard Attrition Index (hereinafter "EAI") of those microspheres, as determined by the procedure described in the publication entitled "Engelhard Attrition Index," is no more than about 5.0 times greater than, preferably no more than about 3.0 times greater than, and most preferably no greater than about 1.5 times that of standard commercial catalyst. This publication is publicly available at the Library identified above (Dewey Decimal Number 665.533 EC/EAI). In addition, a copy of this publication can be obtained by writing to Engelhard's Minerals and Chemicals Division Patent Department.

The good to excellent attrition resistance of the microspheres of the present invention is underscored by two additional factors, namely: (a) Ultrasiv ® 260 catalyst is the most attrition resistant commercial fluid catalytic cracking catalyst of which we are aware; and (b) the sample of Ultrasiv ® 260 catalyst used as "standard commercial catalyst" for the purpose of this application has a better attrition resistance than Ultrasiv ® 260 catalyst typically has (i.e., the average EAI of three samples of standard commercial catalyst was 0.27%/sec. as compared to a typical EAI for Ultrasiv ® 260 catalyst of about 0.30–0.40%/sec.).

A preferred catalyst of the present invention comprises microspheres containing about 50–70% by weight Y-faujasite. As used herein, Y-faujasite shall include synthetic faujasite zeolites exhibiting, in the sodium form, an x-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75Å as determined by the technique described in the ASTM standard method of testing titled "Determination Of The Unit Cell Dimension Of A Faujasite-Type Zeolite" (Designation D3942-80) or by an equivalent technique. The term Y-faujasite shall encompass the zeolite in its sodium form as well as in the known modified forms, incuding, e.g., rare earth and ammonium ion exchanged forms and stabilized forms. The percentage of Y-faujasite zeolite in the microspheres of the catalyst of the present invention is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique.

We prefer that the Y-faujasite component of the microspheres of the present invention, in its sodium form, have a crystalline unit cell size of less than about 24.73Å and most preferably less than about 24.69Å. Typically, the Y-faujasite component of the microspheres has a crystalline unit cell size of about 24.64–24.73Å. We believe that a unit cell size range of between 24.64–24.73Å corresponds to a $SiO_2/Al_2O_3$ molar ratio of the Y-faujasite of about 4.1–5.2.

The microspheres of the present invention (including both the zeolitic and non-zeolitic components) preferably have a $SiO_2/Al_2O_3$ molar ratio of about 1.7–3.4 and contain less than about 0.7% by weight sodium oxide ($Na_2O$) and more than about 4.0% by weight rare earth oxide(s) (REO). For the purposes of this application, all percentages of Na$_2$O and REO in the zeolite containing microspheres were calculated on a volatile free basis. The quantity of volatile material in the microspheres was determined by measuring the weight loss of the microspheres after they were calcined first for ½ hour at about 800° F. and then for 1 hour at about 1830° F.

The zeolite containing microspheres of the catalyst of the present invention preferably have less than about 0.20 cc/g. of pores having diameters in the range of of 20-100Å, less than about 0.30 cc/g. of pores having diameters in the range of 600-20,000Å, a surface area of about 300-750 m$^2$/g., and a bulk density of the 200/270 mesh fraction of about 0.8-1.2 g/cc., as determined by the following techniques:

(a) The surface area and the volume of pores having diameters in the range of 20-100Å were determined by conventional nitrogen adsorption and desorption techniques, respectively, using a Micromeritics® Digisorb 2500 Automatic Multi-Gas Surface Area and Pore Volume Analyzer. Before being tested for surface area and volume of pores having diameters in the range of 20-100Å, the microspheres were first pretreated by heating them, under vacuum, at about 480° F. for 16 hours.

(b) The volume of pores having diameters in the range of 600-20,000Å was determined by a conventional mercury intrusion porosimetry technique using a scanning mercury porosimeter manufactured by Quantachrome Corp. The relationship between pore diameter and intrusion pressure was calculated using the Washburn equation and assuming a contact angle of 140° and a surface tension of 484 ergs/cm$^2$. Before being tested for volume of pores having diameters in the range of 600-20,000Å, the microspheres were pretreated by heating them, in air, to about 660° F. for one hour and then cooling them in a dessicator. The mercury intrusion porosimetry technique described above, including the pretreatment of the microspheres, was also used to determine the volumes of pores having diameters in the ranges of 35-20,000Å and 100-600Å referred to in this application.

(c) The bulk density of the 200/700 mesh fraction of the microspheres was calculated using the procedure described in the publication entitled "Engelhard Attrition Index" referred to above. In particular, the bulk density was calculated by dividing the weight of the "original sample" by the volume of that sample (0.661 cc.). The microspheres used to prepare the "sample volume" did not require any treatment for removal of electrostatic charge and were equilibrated at 30-70% relative humidity.

Most preferably, the microspheres of the catalyst of the invention have less than about 0.15 cc/g. of pores having diameters in the range of 20-100Å, less than about 0.20 cc/g. of pores having diameters in the range of 600-20,000Å, a surface area of about 400-750 m$^2$/g. and a bulk density of the 200/270 mesh fraction of about 0.9-1.2 g/cc.

As previously mentioned, the non-zeolitic component of the present invention is preferably derived from microspheres of calcined kaolin clay comprising a mixture of metakaolin and kaolin clay that has been calcined at least substantially through its characteristic exotherm. The calcined clay microspheres have average particle diameters that are typical of commericial fluid catalytic cracking catalysts, e.g., 65-70 microns.

The preferred process for making the microspheres of calcined kaolin clay comprises a series of steps. First, finely divided hydrous kaolin clay (e.g., ASP ®600, a commercially available hydrous kaolin clay described in Engelhard Technical Bulletin No TI-1004, entitled "Aluminum Silicate Pigments"(EC-1167)) is calcined at least substantially through its characteristic exotherm. For example, a one inch bed of the hydrous kaolin clay may be calcined for about 1-2 hours in a muffle furnace at a chamber temperature of about 1800°-1900° F. to produce clay that has been calcined through its characteristic exotherm without any substantial formation of mullite. As another example, a substantial portion of the hydrous kaolin clay may be calcined through its characteristic exotherm into mullite by calcining a one inch bed of the clay in an electrically heated furnace at a chamber temperature higher than about 2100° F.

During calcination, some of the finely divided clay agglomerates into larger particles. After completion of calcination, the agglomerated clay is pulverized into finely divided particles.

Next, an aqueous slurry of finely divided hydrous kaolin clay and the clay that has been calcined through its characteristic exotherm is prepared. The aqueous slurry is then spray dried to obtain microspheres comprising a mixture of hydrous clay and clay that has been calcined at least substantially through its characteristic exotherm. Preferably, a small amount of sodium silicate is added to the aqueous slurry before it is spray dried. We believe that during and after spray drying the sodium silicate functions as a binder between the clay particles.

A quantity (e.g., 3 to 30% by weight of the clay) of zeolite initiator is also preferably added to the aqueous slurry before it is spray dried. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known a "zeolite seeds". The zeolite initiator may or may not exhibit detectable crystallinity by x-ray diffraction.

Adding zeolite initiator to the aqueous slurry of clay before it is spray dried into microspheres is referred to herein as "internal seeding." Alternatively, zeolite initiator may be mixed with the clay microspheres after they are formed and before the commencement of the crystallization process, a technique which is referred to herein as "external seeding".

After spray drying, the microspheres are calcined at a temperature and for a time (e.g., for 2 hours in a muffle furnace at a chamber temperature of about 1350° F.) sufficient to convert the hydrous clay in the microspheres to metakaolin. The resulting microspheres comprise a mixture of metakaolin and kaolin clay that has been calcined at least substantially through its characteristic exotherm in which the two types of calcined clay are present in the same microspheres. Preferably, the microspheres comprise about 30-60% by weight metakaolin and about 40-70% by weight kaolin clay that has been calcined through its characteristic exotherm.

The preferred process for making the calcined kaolin clay microspheres, which was described above, is unusual in that a portion of the clay is calcined twice at high temperatures. In particular, a portion of the clay is calcined at a high temperature: (a) when it is calcined at least substantially through its characteristic exotherm, and (b) when the kaolin clay that has been calcined through the characteristic exotherm is spray dried with hydrous kaolin clay and the resulting microspheres are calcined to convert the hydrous clay to metakaolin. Hereinafter, calcining clay at high temperature twice is referred to as "double calcining" the clay.

We believe that double calcining clay ordinarily would be considered to be a waste of fuel. For example, absent countervailing considerations, the following process, which does not require double calcining any portion of the clay, might be considered to be a more fuel efficient way for making microspheres comprising a mixture of metakaolin and kaolin clay that has been calcined at least substantially through its characteristic in the same microspheres: (a) calcining a first portion of finely divided kaolin clay into metakaolin and pulverizing that metakaolin into finely divided particles; (b) calcining a second portion of finely divided kaolin clay at least substantially through its characteristic exotherm and pulverizing the resulting clay into finely divided particles; (c) forming a slurry of finely divided calcined clay particles comprising a mixture of the particles formed in steps (a) and (b) above; and (d) spray drying the slurry made in step (c) to obtain microspheres comprising a mixture of metakaolin and kaolin clay that has been calcined at least substantially through its characteristic exotherm.

The preferred process of the present invention, which requires double calcining, has at least two advantages over the process described in the preceding paragraph. First, substantially more water must be used in slurries made from metakaolin and kaolin clay that has been calcined through its characteristic exotherm than in slurries made from hydrous clay and kaolin clay that has been calcined through its characteristic exotherm in order to obtain a slurry that is suitable for spray drying. The reason for this is that slurries made from metakaolin and kaolin clay that has been calcined through its characteristic exotherm are, at a given water content, more viscous than slurries made from hydrous clay and clay that has been calcined through its characteristic exotherm. Of course, substantially increasing the amount of water in the slurry that is spray dried increases the amount of water that must be evaporated in the spray drying step and adds significantly to the expense of the spray drying step. Second, the microspheres of calcined clay that are made during the preferred process of the present invention are generally more attrition resistant than the microspheres of calcined clay made during the process described in the preceding paragraph.

In the two processes described above, the metakaolin and kaolin clay that has been calcined through its characteristic exotherm are present in the same microspheres. It should be understood, however, that the present invention, in a broader scope, encompasses deriving the nonzeolitic component of the microspheres of our invention from other sources of calcined clay. For example, we believe that the non-zeolitic component of microspheres comprising more than about 40% by weight Y-faujasite and having the activity, selectivity, hydrothermal stability and attrition resistance characteristics of the present invention can be derived from microspheres comprising a mixture of metakaolin and kaolin clay that has been calcined through its characteristic exotherm without any substantial formation of mullite in which the two types of calcined clay are in separate microspheres.

The separate microspheres of metakaolin and kaolin clay that has been calcined through its characteristic exotherm without any substantial formation of mullite may be made by techniques which are known in the art. For example, the metakaolin microspheres may be made by first spray drying an aqueous slurry of ASP ®600 hydrous kaolin clay and a small amount of a dispersant (e.g., tetrasodium pyrophosphate) to form microspheres of the hydrous clay and then calcining those microspheres under conditions to convert the hydrous clay at least substantially to metakaolin. The metakaolin microspheres may be internally seeded by adding a zeolite initiator to the aqueous slurry of ASP ®600 kaolin clay.

Y-faujasite is allowed to crystallize by mixing the calcined clay microspheres with the appropriate amounts of other constituents (including at least sodium silicate and water), as discussed in detail below, and then heating the resulting slurry to a temperature and for a time (e.g., to 200°–215° F. for 10–24 hours) sufficient to crystallize at least about 40% by weight Y-faujasite in the microspheres.

The calcined clay microspheres are mixed with one or more sources of sodium silicate and water to form a slurry. Zeolite initiator is also added from a source separate from the clay if it had not previously been added to the clay (e.g., by internal seeding). Preferably, the resulting slurry contains: (a) a molar ratio of $Na_2O/SiO_2$ in the solution phase of about 0.49–0.57; and (b) a weight ratio of $SiO_2$ in the solution phase to microspheres of calcined clay of about 1.0–1.7. If necessary, sodium hydroxide may be included in the slurry to adjust the $Na_2O$ in the solution phase to an appropriate level. As used herein, the "solution phase" of the slurry shall include all the material added to the crystallization reactor (including any mixture containing zeolite initiator if the crystallization process is externally seeded), except the material constituting the calcined clay microspheres (including, e.g., any zeolite initiator incorporated into the microspheres by internal seeding).

The following molar and weight ratios of constituents added to the crystallization reactor have provided satisfactory results (unless otherwise indicated the ratios given are molar ratios).

| solution phase $Na_2O$/ solution phase $SiO_2$ | wt. solution phase $SiO_2$/ wt. microspheres |
|---|---|
| 0.57 | 1.00 |
| 0.52 | 1.35 |
| 0.50 | 1.50 |
| 0.49 | 1.70 |

When the crystallization process is internally seeded with amorphous zeolite initiator, we prefer that the molar ratio of $H_2O$ to $Na_2O$ in the solution phase be no less than about 23. The reason for this is that reducing the molar ratio of $H_2O$ to $Na_2O$ in the solution phase to below that level can cause the microspheres to powder during the crystallization process and can result in slower zeolite growth during that process.

The molar ratios of all the constituents present in the crystallization reactor at the commencement of the crystallization process typically are within the following ranges:

| $Na_2O/SiO_2$ | $SiO_2/Al_2O_3$ | $H_2O/Na_2O$ |
|---|---|---|
| 0.30–0.60 | 5–13 | 20–35 |

The preferred weight ratio of water to calcined clay microspheres at the beginning of the crystallization process is about 4–12. In order to minimize the size of the crystallization reactor, we prefer to maximize the amount of calcined kaolin clay microspheres added to the reactor and to minimize the amount of water present during the crystallization process. However, as this is done, the crystalline unit cell size of the zeolite crystallized increases. The preferred ratio of water to microspheres is, therefore, a compromise between that which results in maximum solids content in the crystallization reactor and that which results in a minimum unit cell size of the zeolite.

Good crystallization was obtained when the constituents added to the crystallization reactor provided the following molar and weight ratios at the commencement of the crystallization process (unless otherwise indicated the ratios given are molar ratios):

| $Na_2O/SiO_2$ | $SiO_2/Al_2O_3$ | $H_2O/Na_2O$ | wt. $H_2O$/ wt. microspheres |
|---|---|---|---|
| .390 | 7.90 | 22.0 | 4.9 |
| .362 | 5.65 | 27.3 | 4.5 |
| .576 | 12.7 | 30.4 | 11.3 |

The sodium silicate and sodium hydroxide reactants may be added to the crystallization reactor from a variety of sources. For example, the reactants may be provided as an aqueous mixture of N ®Brand sodium silicate and sodium hydroxide. As another example, at least part of the sodium silicate may be provided by the mother liquor produced during the crystallization of another zeolite containing product, e.g., a concentrated mother liquor by-product produced during the manufacture of an Engelhard HFZ ® catalyst. Such a concentrated mother liquor by-product typically might contain about 15.0% by weight $Na_2O$, 29% by weight $SiO_2$ and 0.1% by weight $Al_2O_3$. Crystallization processes of the type used to manufacture HFZ ® catalysts are described in U.S. Pat. No. 3,647,718.

After crystallization process is terminated, the microspheres containing Y-faujasite are separated from at least a substantial portion of their mother liquor, e.g., by filtration. It may be desirable to wash the microspheres by contacting them with water either during or after the filtration step. The purpose of the washing step is to remove mother liquor that would otherwise be left entrained within the microspheres.

The microspheres contain Y-faujasite in the sodium form. In order to obtain a product acceptable catalytic properties, it is necessary to replace sodium cations in the microspheres with more desirable cations. This is accomplished by contacting the microspheres with solutions containing ammonium or rare earth cations or both. The ion exchange step or steps are preferably carried out so that the resulting catalyst contains at least about 4%, preferably at least about 7%, by weight REO and less than about 0.7%, most preferably less than about 0.3%, by weight $Na_2O$. After ion exchange, the microspheres are dried, preferably by flash drying, to obtain the microspheres of the present invention.

Particularly when the microspheres of calcined clay which are used to make the catalyst of the present invention comprise a mixture of metakaolin and clay that has been calcined at least substantially through the characteristic exotherm without any substantially formation of mullite, it may be desirable to reduce the volume of pores in the catalyst having diameters in the range of 20–100Å. This may be accomplished by a technique known as silica retention.

Silica retention may effect several catalytic and physical characteristics of the microspheres of the catalyst of the present invention. For example, microspheres of the invention that have been silica retained frequently provide lower coke yields than do microspheres that have not been silica retained. Silica retention, however, typically lowers the activity of the microspheres. Another effect of silica retention is that silica retained microspheres of the invention typically exhibit a lower EAI than do microspheres that have not been silica retained.

Silica retention can be achieved by separating the microspheres from the zeolite crystallization process mother liquor without washing, thereby leaving a portion of the sodium silicate from the mother liquor entrained within the microspheres. The microspheres with mother liquor entrained within them are then dried, preferably in a flash drier having an inlet temperature of about 1100° F. Alternatively, silica retention may be achieved by contacting the microspheres after they are separated from the crystallization reaction mother liquor with a sodium silicate solution (containing, e.g., about 20% by weight $SiO_2$) and drying the microspheres containing sodium silicate as described above. The dried product containing sodium silicate within the microspheres may then be ion exchanged by the procedures described above. During the ion exchange step, at least a major portion of the sodium silicate entrained in the microspheres is converted to amorphous silica.

BRIEF DESCRIPTION OF THE DRAWINGS

FIG. 3 shows a graph comparing hydrogen yields of a first catalyst of the present invention and of the standard commercial catalyst as a function of activity.

FIG. 4 shows a graph comparing coke yields of a first catalyst of the present invention and of the standard commercial catalyst as a function of activity.

FIG. 5 shows a graph comparing hydrogen yields of a second catalyst of the present invention and of the standard commercial catalyst as a function of activity.

FIG. 6 shows a graph comparing coke yields of a second catalyst of the present invention and of the standard commercial catalyst as a function of activity.

DESCRIPTION OF THE PREFERRED EMBODIMENTS

Figure 1:
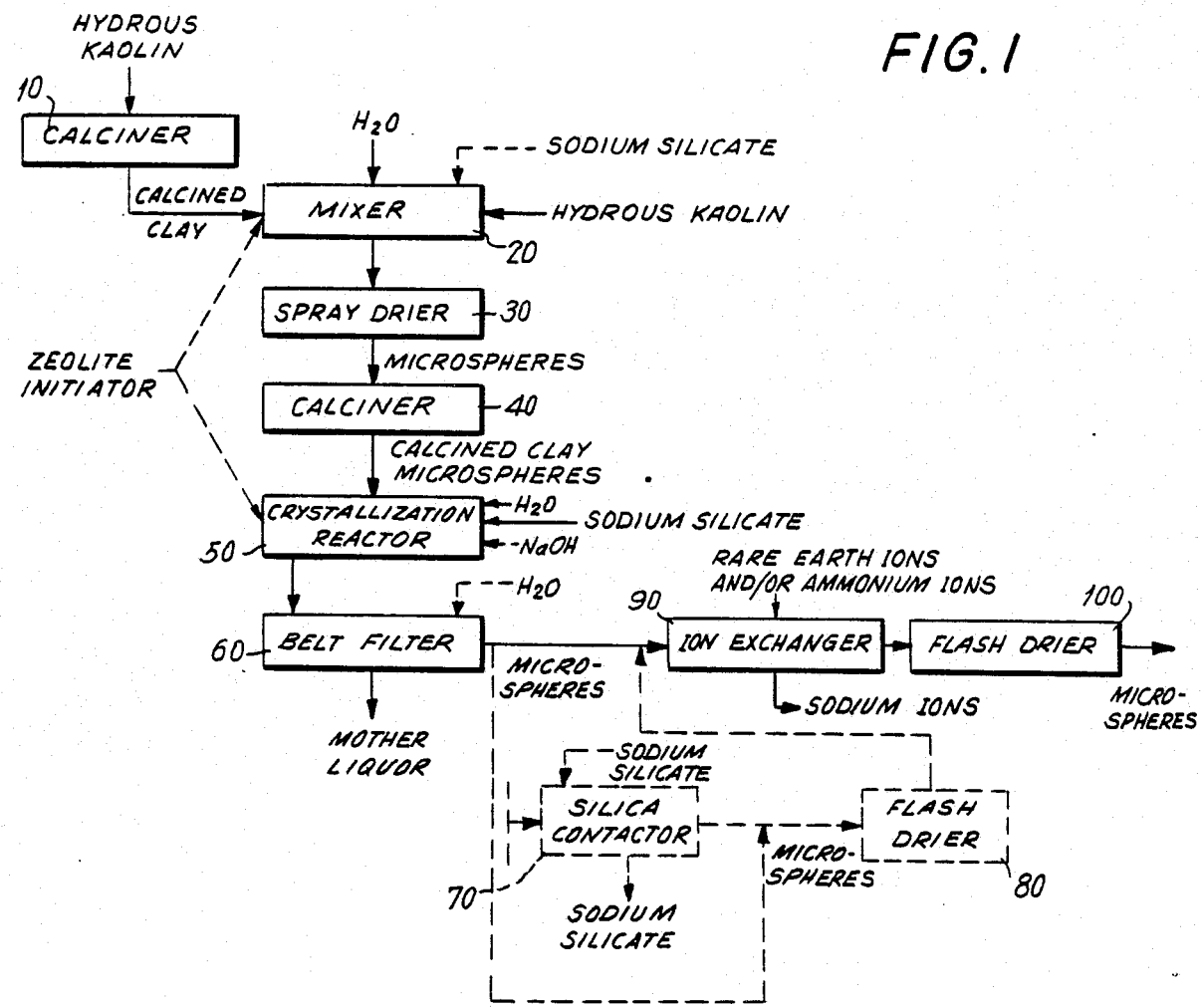
FIG. 1 shows a flow sheet depicting preferred processes for making the catalyst of the present invention.

Referring to FIG. 1, there is shown a flow sheet for preferred processes for making the catalyst of the present invention. In the first step, finely divided hydrous kaolin clay is calcined at least substantially through its characteristic exotherm in calciner 10. During calcination, a substantial portion of the finely divided clay is agglomerated into larger particles. After calcination, the agglomerated material is pulverized into finely divided calcined clay in a pulverizer (not shown).

Next, the finely divided kaolin clay that has been calcined at least substantially through its characteristic exotherm is slurried with finely divided hydrous kaolin clay and water in mixer 20. Preferably, zeolite initiator and a source of sodium silicate are also introduced into the mixer.

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The amorphous zeolite initiator may be prepared by mixing solutions of sodium silicate and sodium aluminate and aging the mixture for a time and at a temperature sufficient to form the amorphous zeolite initiator. Good amorphous zeolite initiators for internal seeding have been made by aging a mixture having the molar ratios indicated below for 24 or more hours at 100° F.:

| $Na_2O/SiO_2$ | $SiO_2/Al_2O_3$ | $H_2O/Na_2O$ |
|---|---|---|
| 1.005 | 17.60 | 17.66 |

Best results have been obtained when a sodium silicate solution was added rapidly to a sodium aluminate solution, with rapid mixing, or when the two solutions were simultaneously added to a mixer, with rapid mixing.

When the sodium silicate and sodium aluminate solutions are mixed, the resulting mixture is clear. However, after the mixture has been aged at 100° F. for about 24 hours or longer, it begins to acquire a cloudy appearance. We prefer that the mixture comprising zeolite initiator used for internal seeding have such a cloudy appearance because the use of a clear mixture comprising zeolite initiator can result in slower zeolite growth during the crystallization process and a crystallization product having a higher EAI.

In contrast, we prefer that the mixture containing amorphous zeolite initiator used for external seeding be clear. The reason for this is that the use of cloudy amorphous zeolite initiator containing mixtures as external seeds can result in a crystallization product having a higher EAI and the formation of excessive fines during the crystallization process.

An advantage of internally seeding with a sodium silicate solution containing an amorphous zeolite initiator is that single solution performs dual functions. In particular, the zeolite initiator functions to assist initiation of the crystallization process and the sodium silicate functions as a binder between the clay particles during and after the spray drying step described below.

The slurry made in mixer 20 is introduced into spary drier 30. In the spray drier, the slurry is sprayed from a wheel type atomizer into a chamber having an air inlet temperature of, e.g., about 1000° F. and air outlet temperature of, e.g., about 225° F. to form microspheres comprising a mixture of particles of hydrous kaolin clay and particles of kaolin clay that have been calcined at least substantially through its characteristic exotherm in the same microspheres.

The microspheres formed in the spray drier are then passed into calciner 40 where they are heated at a temperature and for a time sufficient to convert the hydrous clay into metakaolin.

Zeolite is allowed to crystallize in the spray dried microspheres by mixing the microspheres with at least water, one or more sources of sodium silicate and, if the microspheres were not internally seeded, amorphous zeolite initiator, and heating the resulting mixture to a temperature and for a time sufficient to crystallize at least about 40% by weight Y-faujasite in the microspheres. Sodium hydroxide may be added to the crystallization reactor 50 if it is necessary to raise the $Na_2O$ content of the mixture in the reactor to obtain good crystallization.

The contents of the crystallization reactor 50 are preferably heated to about 200°-215° F. during crystallization. The length of reaction time, of course, depends on a number of process variables, but typically is on the order of 10-24 hours. After the crystallization process is terminated, the microspheres with zeolite crystallized in them are separated from at least a major portion of their mother liquor. The preferred method for accomplishing this is by filtering, e.g., by belt filter 60. In the terminal portion of the belt filter, the microspheres may be contacted with water to wash residual mother liquor from the microspheres and to obtain microspheres that are substantially free of residual mother liquor. The microspheres obtained from belt filter 60, when dried, contain at least about 40%, and preferably about 50-70%, by weight Y-faujasite.

Figure 2:
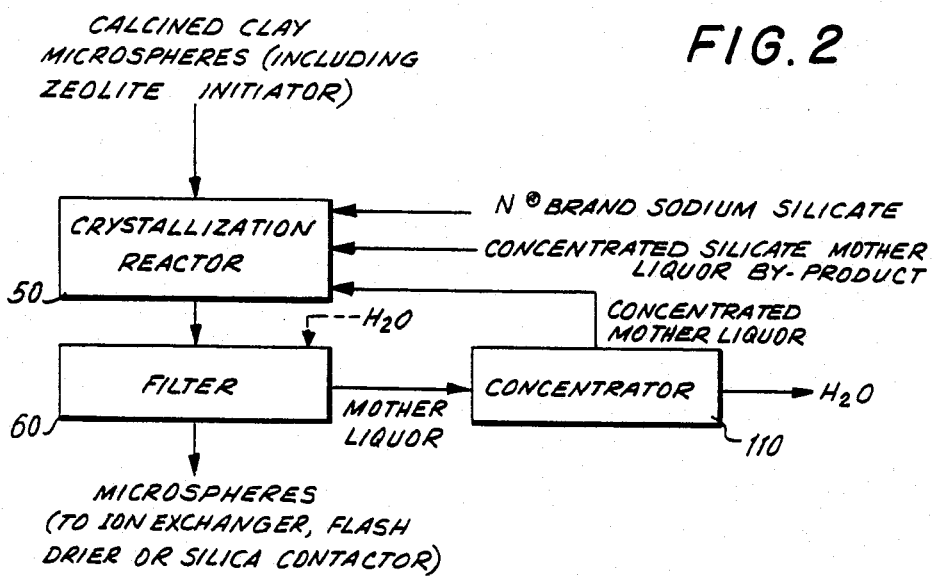
FIG. 2 shows a flow sheet depicting the input streams into the crystallization reactor in a preferred embodiment of the present invention.

The sodium hydroxide and sodium silicate reactants may be introduced into the crystallization reactor from any suitable source. In a preferred embodiment, portions of the sodium silicate are provided by mother liquor recycled, in a concentrated form, from belt filter 60 and by mother liquor, in a concentrated form, produced during the crystallization reaction of another zeolite product, e.g., the concentrated mother liquor by-product produced during the manufacture of an HFZ ® catalyst. FIG. 2 shows a flow sheet depicting the input streams into the crystallization reactor 50 in a preferred embodiment of the present invention.

Concentrating the mother liquor obtained from belt filter 60 may be accomplished by evaporating water from the mother liquor in concentrator 110. The concentrated mother liquor might contain, e.g., about 8% by weight $Na_2O$, about 14% by weight $SiO_2$, and about 0.1% by weight $Al_2O_3$. A concentrated mother liquor by-product produced during the manufacture of an HFZ ® catalyst might contain about 15% by weight $Na_2O$, about 29% by weight $SiO_2$ and about 0.1% by weight $Al_2O_3$. Sodium silicate solution having an $SiO_2/Na_2O$ molar ratio higher than 2.0 (e.g., N ®Brand sodium silicate solution) may also be introduced into the crystallization reactor from a separate source, as depicted in FIG. 2.

After the crystallization reaction product is filtered from its mother liquor in belt filter 60, the next step in the process of the present invention depends on whether or not it is desired to reduce the micropore volume of the microspheres by silica retention and, if so, to what degree it is to be reduced. Silica retention, when it is desired, may be accomplished by either of two alternative processes.

In the first alternative, the microspheres with zeolite crystallized in them are separated from the zeolite crystallization mother liquor so that a portion of the mother liquor is left entrained within the microspheres. This may be accomplished simply by filtering the microspheres in the belt filter 60, without washing the microspheres with water. The microspheres are then dried, leaving a portion of the mother liquor (including sodium silicate) in them, In the second alternative, the microspheres separated in belt filter 60 are introduced into silicate contactor 70 where they are contacted with a sodium silicate solution, e.g., a solution containing about 20% by weight sodium silicate. Preferably, the contacting step takes place by moving the sodium silicate solution through a bed of microspheres. Next, the microspheres are dried leaving a portion of the sodium silicate in them. In both alternatives, drying is preferably conducted in flash drier 80, at an air inlet temperature of about 1100° F.

The microspheres that are filtered in belt filter 60 contain Y-faujasite zeolite in the sodium form. Typically, the microspheres contain more than about 8% by weight $Na_2O$. To prepare the microspheres of the present invention, a substantial portion of the sodium ions in the microspheres are replaced by ammonium or rare earth ions or both in ion exchanger 90.

Ion exchange may be conducted by a number of different ion exchange methods. Preferably, the microspheres are first exchanged one or more times with an ammonium nitrate solution at a pH of about 3-4. The ion exchange(s) with ammonium ions are preferably followed by one or more ion exchanges with rare earth ions at a pH of about 3-4. The rare earth may be provided as a single rare earth material or as a mixture of rare earth materials. Preferably, the rare earth is provided in the form of nitrates or chlorides. The preferred microspheres of the invention are ion exchanged to contain at least about 4%, most preferably at least about 7%, by weight REO and less than about 0.7%, more preferably less than about 0.5%, and most preferably less than about 0.3% by weight $Na_2O$.

After ion exchange is completed, the microspheres are filtered and dried. Preferably, the microspheres (including both the zeolitic and non-zeolitic components) that are obtained have an $SiO_2/Al_2O_3$ molar ratio of about 1.7-3.4.

The microspheres of the invention may be marketed either in a pure form or blended with other catalysts, additives and/or other blending agents. We believe that often the microspheres of the invention will be introduced into commercial catalytic cracking units in a blend. We anticipate that catalysts containing the microspheres will be particularly useful for cracking petroleum feedstocks containing more than about 2 ppm vanadium and more than about 2 ppm nickel.

We believe that one advantage of the microspheres of the invention is that those microspheres are so active that, in many applications, 50% or more of the material introduced into the catalytic cracking unit will be material that is blended with the microspheres of the invention. This permits the catalyst manufacturer to tailor the selectivity, activity and other characteristics of the catalyst to fit the particular needs of the catalyst user. Those needs, of course, may vary from one catalyst user to another depending on the feed oil being cracked, the catalytic cracking unit being used, and the products the user desires. By way of example, (a) a component (e.g., microspheres of $Al_2O_3$ or microspheres of $Al_2O_3$ containing $CeO_2$ or mixtures thereof) for reducing the amount of sulfur oxide(s) in flue gases from regenerators used in cyclic fluid catalytic cracking units may be added to the microspheres of the invention of (b) microspheres of calcined kaolin clay having a surface area of about 10–20 $m^2/g$. and a microporosity of about 0.02–0.06 cc/g. that were made by: (i) spray drying an aqueous slurry of ASP®600 hydrous kaolin containing small amounts of tetrasodium pyrophosphate to make microspheres of hydrous kaolin, and (ii) calcining the microspheres at least substantially through the characteristic exotherm without any substantial formation of mullite may be added to the microspheres of the invention if the user wants a catalyst of modified activity, selectivity and other characteristics.

The catalyst of the present invention, like all commercial fluid catalytic cracking catalysts, will be hydrothermally deactivated during the operation of the cracking unit. Accordingly, as used herein, the phrase "cracking the petroleum feedstock in the presence of a catalyst" shall include cracking the petroleum feedstock in the presence of the catalyst in its fresh, partially deactivated, or fully deactivated form.

The examples which follow illustrate the present invention:

EXAMPLE 1

Microspheres comprising a mixture of metakaolin and kaolin clay that has been calcined through its characteristic exotherm were prepared by the following procedure:

A slurry was prepared by mixing 4565 g. of Satintone® No. 1 calcined kaolin (a commercially available finely divided kaolin clay that has been calcined through its characteristic exotherm without any substantial formation of mullite described in the Engelhard Technical Bulletin entitled "Aluminum Silicate Pigments" indentified above), 4565 g. of ASP®600 hydrous kaolin, 399.4 g. of N®Brand sodium silicate solution (28.7% by weight $SiO_2$, 8.9% by weight $Na_2O$), and 6850 g. of $H_2O$. The slurry was spray dried in a 5 foot diameter centrifugally atomizing spray dryer under the following conditions: air inlet temperature 1050° F.; air outlet temperature = 295° F.; atomizer wheel speed = 19,600 RPM. About a one inch bed of the spray dried microspheres was calcined in a muffle furnace for 3 hours at a chamber temperature of 1375° F. to convert the hydrous kaolin in the microspheres to metakaolin. This calcination procedure was repeated until all the microspheres had been calcined to convert the hydrous clay in them into metakaolin.

A mixture containing amorphous zeolite initiator was prepared by the following procedure:

A solution, A, was prepared by mixing 179.3 g. of a sodium silicate solution (14.8% by weight $Na_2O$, 28.6% by weight $SiO_2$, 0.1% by weight $Al_2O_3$) and 27.2 g. of $H_2O$. A solution, B, was prepared by mixing 124.0 g. of a sodium aluminate solution (13.1% by weight $Na_2O$, 3.89% by weight $Al_2O_3$) and 56.5 g. of a NaOH solution (25.36% by weight NaOH). Solutions A and B were heated to 100° F., and mixed as follows:

Solution B was stirred at about 500 RPM with a 3 bladed, 15° pitch, 2 inch diameter stirrer. Solution A was pumped into the stirred solution B at a rate of about 215 cc/min. The pump discharge was at about the level of the stirrer blades.

The above procedure was repeated four additional times. Each batch covered and aged quiescently for about 6 hours at 100° F. Each aged mixture was clear.

The following ingredients were added to an 18 liter Pyrex ® kettle reactor configured for reflux operation:
1830 g. of the mixture containing amorphous zeolite initiator prepared above
3683 g. of N ®Brand sodium silicate (28.7% by weight $SiO_2$, 8.9% by weight $Na_2O$)
4305 g. of sodium silicate solution containing about 14.8% by weight $Na_2O$, 28.6% by weight $SiO_2$, and 0.1% by weight $Al_2O_3$
5427 g. of $H_2O$
1011 g. of the calcined clay microspheres The above ingredients were added to the reactor, in order, with stirring. The ingredients were heated to 210°–214° F. to initiate the crystallization reaction and were maintained at that temperature, with stirring, for 21 hours. At that time, a small portion of the microspheres was removed from the crystallization reactor, washed with water and dried at room temperature. The washed and dried microspheres contained 69% by weight Y-faujasite, having a unit cell size of 24.68Å.

The remaining microspheres with zeolite crystallized in them were separated from their mother liquor by vacuum filtration on three, 18.5 cm. diameter Buchner funnels. The microspheres were allowed to dry for about a half hour on their filters and were then transferred to an oven where they were dried at about 300° F. overnight. The dried microspheres, weighing about 1700 g., were then crushed gently and screened through a 60 mesh screen.

The −60 mesh microspheres were then ion exchanged with ammonium ions by the following procedure:

The microspheres were divided into two parts of about 850 g. each. Each part was ion exchanged by adding the microspheres to about 1700 g. of a stirred, aqueous solution of $NH_4NO_3$ (containing 27% by weight $NH_4NO_3$). Each resulting slurry was adjusted to a pH of 3.3 with $HNO_3$ and heated to 180° F. to achieve ion exchange in a batch process. After 1 hour at 180° F., each slurry was vacuum filtered. Each batch of microspheres was washed with $H_2O$ and dried at room temperature.

Each part of dried microspheres was then transferred to a 4 liter Pyrex ® vacuum Erlenmeyer flask. About 3500 g. of a 27% by weight $NH_4NO_3$ solution at a pH of about 3.3 were added to each Erlenmeyer flask to fill each flask to within about ½ inch of its side arm. Each mixture was stirred at a rate sufficient to suspend the solids, but slow enough to leave an essentially clear layer of solution above the suspended solids in the neck of the flask. After heating to 180° F., additional 27% by weight $NH_4NO_3$ at a pH of about 3.3 was slowly pumped into the bottom of each flask. The $NH_4NO_3$ solution was pumped into the bottom of each flask over about 13 hours to achieve ion exchange in a continuous process. Spent $NH_4NO_3$ solution, essentially free of solids, was allowed to leave each flask through its side arm during the continuous ion exchange process. A total of 32 g. of 27% by weight $NH_4NO_3$ solution per g. of −60 mesh dried microspheres was used during each continuous ion exchange. Each slurry was then vacuum filtered. Each batch of microspheres was washed with $H_2O$ and dried at room temperature.

To reduce the sodium content of the microspheres further, each batch of the dried microspheres was added to a solution of 27% by weight $NH_4NO_3$. The weight ratio of $NH_4NO_3$ solution to microspheres in each batch was 2.0. The pH of each resulting slurry was adjusted to 3.3 with $HNO_3$. Each pH adjusted slurry was heated to 180° F. for one hour to achieve ion exchange in a batch process. Each slurry was then vacuum filtered and each batch of the microspheres was washed with water.

One of the batches of microspheres was then subjected to two additional batch exchanges by the procedure described in the preceding paragraph. The other batch of the microspheres was subjected to four additional batch exchanges by the procedure described in the preceding paragraph.

The two batches of ammonium ion containing microspheres were combined and added to 3646 g. of $H_2O$, with stirring, to obtain a slurry. To this slurry was added 498 g. of a rare earth chloride solution containing the equivalent of about 19.7% by weight $La_2O_3$, 6.4% by weight $Nd_2O_3$, and 0.1% by weight of each of $CeO_2$, $Sm_2O_3$ and $Pr_6O_{11}$. The pH of the slurry was adjusted to 3.3 with $HNO_3$. The slurry was heated to 180° F., kept at that temperature for about two hours, and then vacuum filtered. The filter cake was washed with $H_2O$ and dried at room temperature. The dried microspheres weighed about 1600 g.

The dried microspheres were then ion exchanged with ammonium ions as follows:

At room temperature, the microspheres were added to 3200 g. of a solution containing 27% by weight $NH_4NO_3$, with stirring. The pH of the resulting slurry was adjusted to 3.3 with $HNO_3$. The pH adjusted slurry was heated to 180° F. and kept at that temperature for one hour. The slurry was then vacuum filtered and the microspheres were washed with $H_2O$.

The ion exchange procedure described in the preceding paragraph was repeated four additional times. After the fifth exchange, the microspheres were dried at room temperature.

The microspheres were then ion exchanged with rare earth ions as follows:

At room temperature, the microspheres were added to 2107 g. of $H_2O$, with stirring. 479 g. of the mixed rare earth chloride solution described above was added to the slurry of microspheres. The slurry was adjusted to a pH of 3.3 with $HNO_3$ and heated to 180° F. After one hour at 180° F., the slurry was vacuum filtered and the microspheres were washed with $H_2O$ and dried at room temperature.

The microspheres were then subjected to a final ion exchange with rare earth ions as follows:

At room temperature, the microspheres were added to 2000 g. of $H_2O$ with stirring. 38.6 g. of the mixed rare earth chloride solution described above were added to the slurry of microspheres in water and the pH of that slurry was adjusted to 3.3 with $HNO_3$. The slurry was heated to and maintained at 180° F. for one hour. The slurry was then vacuum filtered and the microspheres were washed with $H_2O$ and dried at room temperature.

The microspheres (including both the zeolitic and non-zeolitic components) contained 0.18% by weight $Na_2O$ and 7.3% by weight REO and had a $SiO_2/Al_2O_3$ molar ratio of 2.88 (57.5% by weight $SiO_2$ and 33.9% by weight $Al_2O_3$, both on a volatile free basis).

The microspheres had 0.06 cc/g. of pores having diameters in the range of 20–100 Å, 0.02 cc/g. of pores having diameters in the range of 100–600Å, .003 cc/g. of pores having diameters of 600–20,000Å, a total porosity of 0.04 cc/g., a surface area of 489 m²/g. and a bulk density of the 200/270 mesh fraction of 0.97 g/cc.

The EAI of the microspheres was 0.73%/sec. In comparison, the EAI of standard commercial catalyst was 0.27%/sec. The EAI of the microspheres of this example was, therefore, 2.7 times that of standard commercial catalyst.

The deactivated and severely deactivated activities of the microspheres of this example and of standard commercial catalyst were determined using the procedures described above. The results of those determinations are recorded in Table I below. Each activity for the microspheres of this example recorded in Table I is the average of three separate activity determinations made on three samples that had been steamed, separately, under the specified conditions. The deactivated activity for standard commercial catalyst recorded in Table I is the average of 12 separate activity determinations and the severely deactivated activity recorded in Table I for that catalyst is the average of 6 separate activity determinations. As can be computed from the table, the deactivated activity of the microspheres of this example is 2.4 times that of standard commercial catalyst and the severely deactivated activity of the microspheres of this example is 2.8 times that of standard commercial catalyst.

TABLE I

| Steaming Conditions | Activity of Microspheres of Example 1 | Activity of Standard Commercial Catalyst |
|---|---|---|
| 1450° F. for four hours | 6.46 | 2.67 |
| 1500° F. for four hours | 4.26 | 1.51 |

In addition to hydrothermally deactivating quantities of the microspheres of this example at the above steaming conditions, three separate portions of the microspheres were hydrothermally deactivated at 1550° F. for four hours. The activity of a sample of each of those portions was determined by the ASTM standard procedure.

The hydrogen yield that was obtained using the microspheres of this example during each run of the ASTM standard procedure was determined. A Carle 0196 refinery gas analyzer manufactured by Carle Instruments, Inc. was used in making this determination. The gas that was made during each ASTM microactivity test was fed into the gas analyzer from a gas collection reservoir placed in the vent line of the ASTM microactivity test apparatus (see FIG. 1 of ASTM D-3907-80). The operating procedure for the gas analyzer is detailed in the Carle 0196 operating manual.

The coke yield that was obtained using the microspheres of this example during each run of the ASTM standard procedure was also determined. The coke yield determination was made by measuring the carbon content of the catalyst sample after the ASTM standard procedure was conducted, using a Leco CS46 carbon/sulfur analyzer, and then calculating the weight percentage of coke produced during the ASTM standard procedure based on the weight of the standard gas oil feed used during that procedure according to the formula:

$$\text{wt. \% coke} = \frac{\text{carbon wt. \%} \times 13 \times \text{catalyst wt.} \times 100}{(100 - \text{carbon wt. \%}) \times 12 \times \text{feed wt.}}$$

where "carbon wt. %" is the % by weight of the carbon in the catalyst analyzed (including the coke deposited on the catalyst), "catalyst wt." is the weight of the catalyst analyzed (including the coke deposited on the catalyst) and "feed wt." is the weight of standard gas oil feed used during the ASTM standard procedure (1.33 g.). The operating procedure for the Leco analyzer is detailed in the CS46 operating manual.

The hydrogen and coke yields that were obtained in this series of ASTM microactivity tests are recorded in Table II below. All percentages recorded in this Table and in the Tables in the examples below are weight percentages based on the weight of the standard gas oil feed used in the ASTM standard procedure.

TABLE II

| Activity Of Microspheres Of Example 1 | Coke Yield Of Microspheres Of Example 1 (wt. %) | Hydrogen Yield Of Microspheres Of Example 1 (wt. %) |
|---|---|---|
| 2.28 | 2.54 | 0.03 |
| 2.61 | 2.87 | 0.02 |
| 2.83 | 3.22 | 0.02 |
| 3.50 | 5.18 | 0.03 |
| 4.27 | 5.37 | 0.03 |
| 5.01 | 5.51 | 0.04 |
| 5.47 | 7.89 | 0.08 |
| 6.43 | 8.60 | 0.04 |
| 7.48 | 9.02 | 0.04 |

In addition to the quantities of standard commercial catalyst that were hydrothermally deactivated at 1450° and 1500° F., quantities of standard commercial catalyst were hydrothermally deactivated at 1400° F. for four hours and at 1550° F. for four hours. Several runs of the ASTM standard procedure were conducted for samples of the standard commericial catalyst that had been hydrothermally deactivated at 1400°, 1450°, 1500° and 1550° F. The activity, and hydrogen and coke yields that were obtained during each run were determined by the same procedures described above. The results are recorded in Table III below:

TABLE III

| Activity Of Standard Commercial Catalyst | Coke Yield Of Standard Commercial Catalyst (wt. %) | Hydrogen Yield Of Standard Commercial Catalyst (wt. %) |
|---|---|---|
| 0.36 | 1.51 | 0.09 |
| 0.52 | 1.51 | 0.09 |
| 0.56 | 1.81 | 0.13 |
| 0.56 | 1.72 | 0.12 |
| 1.24 | 2.28 | 0.09 |
| 1.30 | 2.04 | 0.09 |
| 1.43 | 2.40 | 0.06 |
| 1.54 | 2.39 | 0.08 |
| 1.71 | 2.85 | 0.08 |
| 1.85 | 2.32 | 0.10 |
| 1.86 | 2.87 | 0.06 |
| 2.00 | 2.87 | 0.04 |
| 2.50 | 3.16 | 0.05 |
| 2.53 | 3.11 | 0.04 |
| 2.59 | 4.11 | 0.06 |
| 2.65 | 3.19 | 0.04 |
| 2.65 | 3.44 | 0.05 |
| 2.70 | 3.21 | 0.05 |
| 2.92 | 3.07 | 0.05 |
| 2.97 | 3.42 | 0.05 |
| 2.98 | 3.27 | 0.08 |
| 3.08 | 3.26 | 0.04 |
| 3.14 | 3.28 | 0.06 |
| 3.30 | 4.14 | 0.05 |

TABLE III-continued

| Activity Of Standard Commercial Catalyst | Coke Yield Of Standard Commercial Catalyst (wt. %) | Hydrogen Yield Of Standard Commercial Catalyst (wt. %) |
| --- | --- | --- |
| 3.63 | 4.42 | 0.04 |

A graph depicting hydrogen yield against activity for both the microspheres of this example and standard commercial catalyst is shown in FIG. 3. The lines that appear in the Figure were drawn by calculating the first order least square fit for each set of applicable data recorded in Tables II and III and then drawing lines based on those calculations. As can be seen from FIG. 3, at 70% conversion (an activity of 2.33) the hydrogen yields of the microspheres of this example and of standard commercial catalyst were about 0.02 wt. % and about 0.06 wt. %, respectively.

A graph depicting coke yield against activity for both the catalyst of this example and standard commercial catalyst is shown in FIG. 4. The lines that appear in FIG. 4 were drawn using the least square fit procedure used to draw the lines in FIG. 3. At 70% conversion the coke yields of the microspheres of this example and of standard commercial catalyst were about 2.8 wt. % and about 3.1 wt. %, respectively.

We recommend that the following procedure (which was used for the microspheres of Example 3 below) be used to determine the coke and hydrogen yields of catalysts at 70% conversion. This procedure can be used to determine whether or not the coke and hydrogen yields of a catalyst at 70% conversion fall within the scope of the coke and hydrogen yields of the microspheres of the catalyst of the present invention:

(a) Choose two hydrothermal deactivation temperatures which differ from each other by 50° F. and which satisfy the following criteria: (i) the catalyst being evaluated, when hydrothermally deactivated at one of the two temperatures, should exhibit an activity greater than 2.33 when tested by the ASTM standard procedure; and (ii) the catalyst being evaluated, when hydrothermally deactivated at the other of the two temperatures, should exhibit an activity of less than 2.33 when tested by the ASTM standard procedure. For the microspheres of Example 3 below, the two hydrothermal deactivation temperatures used that satisfied these criteria were 1500° and 1550° F.

(b) Choose a third hydrothermal deactivation temperature that differs by 50° F. from either one of the two temperatures chosen in step (a). For the microspheres of Example 3, the temperature that was used that satisfied this criterion was 1450° F.

(c) Hydrothermally deactivate three portion of the catalyst being evaluated at each of the three temperatures chosen in steps (a) and (b) to obtain nine separate portions of hydrothermally deactivated catalyst. Using the ASTM standard procedure, determine the activity and hydrogen and coke yields of a sample of each of the nine portions of catalyst using the procedures described above. Graphs depicting hydrogen and coke yields against activity are then drawn from the results of those determinations by calculating the first order least square fit for the data as described above.

Satisfactory graphs of hydrogen and coke yields against activity can be obtained using procedures other than that described in the preceding paragraph. For example, we did not use the above procedure in determining the coke and hydrogen yields of standard commercial catalyst and of the microspheres of Examples 1, 2 and 4 at 70% conversion. We believe, however, that FIGS. 3–10 accurately reflect the relative coke and hydrogen yields of standard commercial catalyst and of the microspheres of the examples at 70% conversion. Therefore, in order to expedite the filing of this application, we did not conduct the tests necessary to comply fully with the procedure described in the preceding paragraph.

The stability of the microspheres of this example in the presence of nickel and vanadium was determined by depositing vanadium and nickel on the microspheres and then determining the deactivated activity of the resulting microspheres. The steaming procedure that was used in connection with determining the deactivated activity of metals contaminated catalysts in this application was the "closed system" procedure described in Appendix A of the publication entitled "Engelhard Procedure For The Hydrothermal Deactivation Of Fluid Catalytic Cracking Catalysts" identified above.

The nickel and vanadium were deposited on the microspheres by the following procedure:

(a) 3.1 g. of nickel naphthenate solution (Ni-215, marketed by ROC-RIC Chemicals and containing 13.5% by weight nickel) and 33.0 g. of vanadium naphthenate solution (V-209, marketed by ROC-RIC Chemicals and containing 2.57% by weight vanadium) were dissolved in 105 cc. of cyclohexane. The amount of cyclohexane used was sufficient to wet the microspheres to incipient wetness in step (b) below (i.e., about 0.5 cc. of cyclohexane was used per gram of microsphere, on a volative free basis). The amounts of nickel naphthenate and vanadium naphthenate solutions that were added to the cyclohexane were determined by analyzing the nickel and vanadium contents of the solutions marketed by ROC-RIC Chemicals and then adding enough of those solutions to the cyclohexane to obtain about 2000 ppm nickel and 4000 ppm vanadium on the catalyst, assuming that 100% of the metals are deposited onto the catalyst.

(b) The solution made in step (a) was added slowly, with mixing, to 210 g. (on a volatile free basis) of the microspheres of this example. Mixing was continued until a homogenous, moist paste was obtained. The paste was moist enough to be cohesive, but no liquid was visible.

(c) The paste formed in step (b) was dried, in air, in a hood. The paste was stirred to homogeneity periodically over the first four hours of drying. Drying was completed overnight.

(d) A small sample of the microspheres was calcined for about 2 hours at 1100° F. in a muffle furnace. About a ½ inch bed of the remaining microspheres was calcined first in a vented oven for about ¾ hour at 600° F. and then in a muffle furnace at 1100° F. for a sufficient amount of time to remove carbon residue from the microspheres, i.e., for a period of about 2 hours.

(e) Each of the calcined samples was analyzed for vanadium and nickel contents by dissolving the sample in a solution comprising nitric, sulfuric and hydrofluoric acids and analyzing the solution for vanadium and nickel using a conventional atomic absorption spectroscopy technique. The average of the two analyses showed that the microspheres contained 2360 ppm of nickel and 4310 ppm of vanadium. The amount of vanadium deposited was within the goal of 4000±400 ppm, but the amount of nickel was slightly outside the goal of 2000 ±200 ppm. The procedure was not re-run for the purposes of this example, however, because an excessive amount of nickel was deposited on the catalyst.

There is nothing critical about the quantities of microspheres that are contaminated with metals according to the above procedure. For example, 50 g. of microspheres rather than 210 g. of microspheres could be contaminated with metals according to this procedure. Of course, if 50 g. of microspheres were contaminated, then the quantities of the other materials used would have to be adjusted proportionally. In addition, nickel and vanadium naphthenate solutions equivalent to those marketed by ROC-RIC Chemicals may be used in the above procedure.

There are two caveats concerning the above procedure for depositing nickel and vanadium on catalysts. First, on occasion incipient wetness of the catalyst is not achieved when the procedure described in steps (a) and (b) is followed, i.e., a moist, homogenous mixture is not obtained after mixing. In that case, additional cyclohexane should be added slowly to the microspheres, with stirring, until a moist, homogenous paste is obtained. The second caveat is that sometimes a catalyst is obtained that does not contain 2000±200 ppm nickel and 4000±400 ppm vanadium. In those cases, in order to obtain more precise results, the procedure may be repeated again, starting with a new sample of catalyst.

The microspheres of this example, with the metals deposited on them, had a deactivated activity of 3.88. In contrast, standard commercial catalyst, with 1950 ppm nickel and 3810 ppm vanadium deposited on it, had a deactivated activity of 0.94. Accordingly, the deactivated activity of the metals contaminated microspheres of the present example was 4.1 times the deactivated activity of the metals contaminated standard commercial catalyst. In addition, the metals contaminated microspheres of this example exhibit a severely deactivated activity that was 4.6 times the severely deactivated activity of the metals contaminated standard commercial catalyst.

EXAMPLE 2

Microspheres comprising a mixture of metakaolin and kaolin clay that has been calcined through its characteristic exotherm were prepared by the following procedure:

A slurry was prepared by mixing 10,400 g. of Satintone ® No. 1 calcined kaolin, 5600 g. of ASP ®600 hydrous kaolin, 700 g. of N ® Brand sodium silicate solution, and 13,750 g. of $H_2O$. The slurry was spray dried in a 5 foot diameter centrifugally atomizing spray dryer under the following conditions: air inlet temperature=1050° F.; air outlet temperature=360° F.; atomizer wheel speed=19,600 RPM. About a one inch bed of the spray dried microspheres was calcined in a muffle furnace for 3 hours at a chamber temperature of 1375° F. to convert the hydrous kaolin in the microspheres to metakaolin. This calcination procedure was repeated until all the spray microspheres had been calcined to convert the hydrous clay in them into metakaolin.

The following ingredients were added to an 18 liter Pyrex ® kettle reactor configured for reflux operation:
  1830 g. of a mixture containing amorphous zeolite initiator prepared by the procedure described in Example 1
  7935 g. of N ® Brand sodium silicate
  5484 g. of NaOH solution made from 354 g. of NaOH pellets and $H_2O$
  1011 g. of the calcined clay microspheres The above ingredients were added to the reactor, in order, with stirring. The ingredients were heated to 210-214° F. to initiate the crystallization reaction and maintained at that temperature. Beginning at about 16 hours after initiation of the reaction, small samples of microspheres were removed from the reactor, washed with water and analyzed for Y-faujasite.

When the Y-faujasite content of the microspheres reached about 60% by weight, the microspheres were separated from their mother liquor by vacuum filtration on three, 18.5 cm. diameter Buchner funnels. The microspheres were washed with $H_2O$ and dried at room temperature.

The above procedure was repeated four times, yielding about 6800 g. of microspheres. The average Y-faujasite content of the microspheres was 59% by weight. The average crystalline unit cell size was about 24.69 ÅA.

The dried microspheres were ion exchanged with ammonium ions by the following procedure:

At room temperature, the microspheres were added to 13,600 g. of a stirred solution of $NH_4NO_3$ (containing 27% by weight $NH_4NO_3$). The resulting slurry was adjusted to a pH of 3.3 with $HNO_3$. The slurry was then heated to 180° F. to achieve ion exchange in a batch process. After 1 hour at 180° F., the slurry was vacuum filtered and the microspheres were washed with $H_2O$.

The washed microspheres were transferred to an 18 liter Pyrex ® kettle. About 15 liters of 27% by weight $NH_4NO_3$ solution at a pH of about 3.3 were added to the microspheres to fill the kettle to within about 4 inches of its top. The mixture was stirred at a rate sufficient to suspend the solids, but slow enough to leave an essentially clear layer of solution approximately 3–6 inches thick above the suspended solids. After heating to 180° F., additional 27% by weight $NH_4OH_3$ solution at a pH of about 3.3 was slowly pumped into the bottom of the kettle. About 211,000 g. of $NH_4NO_3$ solution was added over about 25 hours to achieve ion exchange in a continuous process. Spent $NH_4NO_3$ solution, essentially free of solids, was pumped from the clear layer in the kettle during the continuous process. After 25 hours, the slurry was filtered and the microspheres were washed with $H_2O$ and dried at room temperature.

The ammonium ion containing microspheres were then ion exchanged with rare earth ions as follows:

1715 g. of a mixed rare earth chloride solution containing the equivalent of about 16.2% by weight $La_2O_3$, 5.8% by weight $Nd_2O_3$, 3.2% by weight $CeO_2$, 2.3% by weight $Pr_6O_{11}$ and 0.3% by weight $Sm_2O_3$ were mixed with 6549 g. of $H_2O$. The pH of the solution was adjusted to 3.5 with $HNO_3$. The ammonium ion containing microspheres were added to the rare earth containing solution, with stirring. The pH of the slurry was adjusted to 3.5 with $HNO_3$, and the slurry was heated to 180° F. After two hours at 180° F., the slurry was vacuum filtered. The microspheres were washed with $H_2O$ and dried at room temperature.

An additional ion exchange with rare earth ions was conducted by: (a) mixing 37.3 g. of the mixed rare earth chloride solution described in the preceding paragraph with 8753 g. of $H_2O$; (b) adjusting the pH of the solution to 3.5 with $HNO_3$; (c) adding to the rare earth solution, with stirring, the rare earth ion containing microspheres prepared above; (d) adjusting the pH of the slurry to 3.5 with $HNO_3$; and (e) heating the slurry to 180° F. and maintaining the slurry at that temperature for two hours.

The slurry was then vacuum filtered. The microspheres were washed with $H_2O$ and dried at room temperature.

The microspheres (including both the zeolitic and non-zeolitic components) contained 0.23% by weight $Na_2O$ and 7.0% by weight REO and had a $SiO_2/Al_2O_3$ molar ratio of about 2.23 (52.4% by weight $SiO_2$ and 39.8% by weight $Al_2O_3$, both on a volatile free basis).

The microspheres had 0.13 cc/g. of pores having diameters in the range of 20–100 Å, 0.04 cc/g. of pores having diameters in the range of 100–600 Å, 0.11 cc/g. of pores having diameters in the range of 600–20,000 Å, a total porosity of 0.25 cc/g., a surface area of 478 $m^2/g$ and a bulk density of the 200/270 mesh fraction of 0.94 g/cc.

The EAI of the microspheres was 0.94%/sec. The EAI of the microspheres of this example was, therefore, 3.5 times that of standard commercial catalyst.

The deactivated and severely deactivated activities of the microspheres of this example were 6.90 and 5.33, respectively. Each of these values is the average of three separate activity determinations made on three samples that had been hydrothermally deactivated, separately, under the appropriate conditions. The deactivated activity of the microspheres of this example, therefore, is 2.6 times that of standard commercial catalyst and the severely deactivated activity of the microspheres of this example, therefore, is 3.5 times that of standard commercial catalyst.

In addition to hydrothermally deactivating quantities of the microspheres of this example for four hours at 1450° and 1500° F., three separate portions of those microspheres were hydrothermally deactivated for four hours at 1550° F. The activity of a sample of each of those portions was determined by the ASTM standard procedure.

The hydrogen and coke yields that were obtained in the series of ASTM microactivity tests on the microspheres of this example were determined by the procedures described in Example 1. The results of those determinations are recorded in Table IV below.

TABLE IV

| Activity of Microspheres of Example 2 | Coke Yield of Microspheres of Example 2 (wt. %) | Hydrogen Yield of Microspheres of Example 2 (wt. %) |
| --- | --- | --- |
| 2.71 | 3.35 | 0.08 |
| 3.27 | 3.19 | 0.04 |
| 3.35 | 3.62 | 0.07 |
| 4.83 | 5.84 | 0.11 |
| 5.47 | 6.32 | 0.09 |
| 5.70 | 7.10 | 0.06 |
| 6.31 | 8.69 | 0.10 |
| 7.06 | 10.01 | 0.11 |
| 7.32 | 9.70 | 0.05 |

A graph of hydrogen yield against activity for both the microspheres of this example and for standard commercial catalyst is shown in FIG. 5. The lines that appear in the Figure were drawn by calculating the first order least square fit for each set of applicable data recorded in Tables III and IV (with one exception) and then drawing lines based on those calculations. The one exception was that the fourth line for hydrogen yield in Table IV was ignored for the purpose of calculating the least square fit because the information in that line appeared to be erroneous. As can be seen from FIG. 5, at 70% conversion (an activity of 2.33) the hydrogen yields of the microspheres of this example and of standard commercial catalyst were about 0.06 wt. % and about 0.06 wt. %, respectively.

A graph of coke yield against activity for both the microspheres of this example and for standard commercial catalyst is shown in FIG. 6. The lines that were drawn in the graph were drawn by calculating the first order least square fit for each set of applicable data recorded in Tables III and IV and then drawing lines based on the calculations. At 70% conversion the coke yields of the microspheres of this example and of standard commerical catalyst were about 2.1 wt. % and about 3.1 wt. %, respectively.

The stability of the microspheres of this example in the presence of nickel and vanadium was determined by depositing 3600 ppm of vanadium and 1870 ppm of nickel on 200 g. (on a volatile free basis) of the microspheres using the procedure described in Example 1 and then determining the deactivated activity of the metals contaminated microspheres.

The metals contaminated microspheres of this example had a deactivated activity of 3.09. which was 3.3 times the deactivated activity of metals contaminated standard commercial catalyst. The severely deactivated activity of the metals contaminated microspheres of this example was 3.2 times that of metals contaminated standard commercial catalyst.

EXAMPLE 3

A mixture containing aged amorphous zeolite initiator was prepared by the following procedure:

A solution, A, was prepared by mixing 179.3 g. of sodium silicate solution (14.8% by weight $Na_2O$, 28.6% by weight $SiO_2$, 0.1% by weight $Al_2O_3$) and 20.8 g. of $H_2O$. A solution, B, was prepared by mixing 124.0 g. of sodium aluminate solution (13.1% by weight $Na_2O$, 3.89% by weight $Al_2O_3$) and 56.7 g. of a NaOH solution (25.36% by weight NaOH). Solutions A and B were heated and mixed with each other by the same procedure that Solutions A and B were heated and mixed together in Example 1.

The above procedure was repeated one more time and the two batches were combined in a single container. The container was covered and the solution was aged quiescently for about 30 hours at 100° F. The aged mixture was cloudy.

Microspheres comprising a mixture of metakaolin and kaolin clay that has been calcined through its characteristic exotherm were prepared by the following procedure:

A slurry was prepared by mixing 712.3 g. of Satintone ® No. 1 calcined kaolin, 712.3 g. of ASP-600 hydrous kaolin, 610.5 g. of the above mixture containing zeolite initator, and 2850 g. of $H_2O$. The slurry was spray dried in a 3 foot diameter Bowen Model No. 1 fountain nozzle tower spray dryer (manufactured by Bowen Engineering, Inc., Somerville, N.J.), equipped with an 03 nozzle having a 0.15 cm. inside diameter, under the following conditions: counter current air flow; nozzle air pressure=19 psi; air inlet temperature=710° F; air outlet temperature=360° F. A one inch bed of the spray dried microspheres was calcined in a muffle furnace for 3 hours at a chamber temperature of 1375° F. to convert the hydrous kaolin in the microspheres to metakaolin. This calcination procedure was repeated until all the microspheres had been calcined to convert the hydrous clay in them into metakaolin.

The following ingredients were added to a 7 liter Pyrex ® kettle reactor configured for reflux operation:
552 g of N ®Brand sodium silicate
4268 g. of sodium silicate solution containing about 15.2% by weight $Na_2O$, 27.9% by weight $SiO_2$ and 0.1% by weight $Al_2O_3$
2106 g. of $H_2O$
1000 g of the calcined clay microspheres The second sodium silicate solution above was a concentrated mother liquor by-product produced during the manufacture of an Engelhard commercial catalyst.

The above ingredients were added to the reactor, in order, with stirring. The ingredients were heated to 210°–214° F. to initiate the crystallization reaction and maintained at that temperature, with stirring, for 24.5 hours.

The microspheres with zeolite crystallized in them were separated from their mother liquor by vacuum filtration on an 18.5 cm. diameter Buchner funnel. The microspheres were washed with $H_2O$ and dried overnight at room temperature.

The dried microspheres weighed about 1250 g. and contained 72% by weight Y-faujasite zeolite having a crystalline unit cell size of about 24.70 Å.

The dried microspheres were then ion exchanged with ammonium ions by the following procedure:

At room temperature, the microspheres were added to 2200 g. of a stirred solution of $NH_4NO_3$ (containing 27% by weight $NH_4NO_3$). The resulting slurry was adjusted to a pH of 3.5 with $HNO_3$ and heated to 180° F. to achieve ion exchange in a batch process. After 1 hour at 180° F., the slurry was vacuum filtered. The microspheres were washed with $H_2O$ and dried at room temperature overnight.

The dried microspheres were transferred to a 4 liter Pyrex ® vacuum Erlenmeyer flask. About 3500 g. of 27% by weight $NH_4NO_3$ solution at a pH of about 3.5 were added to the microspheres to fill the flask to within about ½ inch of its side arm. The mixture was stirred at a rate sufficient to suspend the solids, but slow enough to leave an essentially clear layer of solution above the suspended solids in the neck of the flask. After heating to 180° F., additional 27% by weight $NH_4NO_3$ solution at a pH of about 3.5 was slowly pumped into the bottom of the flask. About 22,000 g of 27% by weight $NH_4NO_3$ solution was added over about 8 hours to achieve ion exchange in a continuous process. Spent $NH_4NO_3$ solution, essentially free of solids, was allowed to leave the flask through the side arm during the continuous process.

After 8 hours of continuous ion exchange, the slurry was vacuum filtered. The microwere then washed with $H_2O$ dried at room temperature overnight.

The dried microspheres were added to about 1900 g. of a stirred solution of $NH_4NO_3$ (containing 27% by weight $NH_4NO_3$). The resulting slurry was adjusted to a pH of 3.5 with $HNO_3$ and heated to 180° F. After 1 hour at 180° F., the slurry was vacuum filtered and the microspheres were washed with $H_2O$.

The ion exchange described in the preceding paragraph was repeated fifteen additional times. After the last exchange, the washed microspheres were dried at room temperature overnight. The resulting microspheres contained 0.35% by weight $Na_2O$.

The ammonium ion containing microspheres were then ion exchanged with rare earth ions as follows:

A rare earth chloride solution was made by mixing 344 g. of a concentrated mixed rare earth chloride solution (containing the equivalent of about 19.7% by weight $La_2O_3$, 6.4% by weight $Nd_2O_3$, and 0.1% by weight of each of $CeO_2$, $Pr_6O_{11}$, and $Sm_2O_3$) with 1467 g. of $H_2O$. At room temperature, the microspheres were added to the rare earth chloride solution, with mixing. The pH of the slurry was adjusted to 3.5 with $HNO_3$ and heated to 180° F. After about 2 hours at 180° F., the slurry was vacuum filtered. The microspheres were washed with $H_2O$ and dried at room temperature.

A second rare earth chloride solution was made by mixing 27.2 g. of the concentrated mixed rare earth chloride solution described in the preceding paragraph with 1630 g. of $H_2O$. At room temperature, the microspheres were added to the second rare earth chloride solution, with stirring. The pH of the slurry was adjusted to 3.5 with $HNO_3$ and heated to 180° F. After about 2 hours at 180° F., the slurry was vacuum filtered. The microspheres were washed with $H_2O$ and dried at room temperature.

The microspheres (including both the zeolitic and non-zeolitic components) contained 0.35% by weight $Na_2O$ and 7.1% by weight REO and had a $SiO_2/Al_2O_3$ molar ratio of 2.31 (52.6% by weight $SiO_2$ and 38.7% by weight $Al_2O_3$, both on a volatile free basis).

The microspheres had 0.10 cc/g. of pores having diameters in the range of 20–100 Å, 0.04 cc/g. of pores having diameters in the range of 100–600 Å, 0.18 cc/g. of pores having diameters in the range of 600–20,000 Å, a total porosity of 0.29 cc/g., a surface area of 477 m²/g. and a bulk density of the 200/270 mesh fraction of 0.89 g/cc.

The EAI of the microspheres was 1.2%/sec. The EAI of the microspheres of this example was, therefore, 4.4 times that of standard commercial catalyst.

The deactivated and severely deactivated activities of the microspheres of this example were 5.94 and 3.76, respectively. Each of these values is the average of three separate activity determinations made on three samples that had been hydrothermally deactivated, separately, under the appropriate conditions. The deactivated activity of the microspheres of this example, therefore, is 2.2 times that of standard commercial catalyst and the severely deactivated acitivity of the microspheres of this example, therefore, is 2.5 times that of standard commercial catalyst.

In addition to hydrothermally deactivating quantities of the microspheres of this example for four hours at 1450° and 1500° F., three separate portions of those microspheres were hydrothermally deactivated for four hours at 1550° F. The activity of a sample of each of those portions was determined by the ASTM standard procedure.

The hydrogen and coke yields that were obtained in the series of ASTM microactivity tests on the microspheres of this example were determined by the procedures described in Example 1. The results of those determinations are recorded in Table V below.

TABLE V

| Activity of Microspheres of Example 3 | Coke Yield of Microspheres of Example 3 (wt. %) | Hydrogen Yield of Microspheres of Example 3 (wt. %) |
| --- | --- | --- |
| 1.18 | 2.22 | 0.04 |
| 1.96 | 2.56 | 0.06 |

TABLE V-continued

| Activity of Microspheres of Example 3 | Coke Yield of Microspheres of Example 3 (wt. %) | Hydrogen Yield of Microspheres of Example 3 (wt. %) |
|---|---|---|
| 2.12 | 2.39 | 0.06 |
| 2.96 | 4.73 | 0.06 |
| 3.99 | 4.77 | 0.06 |
| 4.34 | 4.75 | 0.08 |
| 5.23 | 7.68 | 0.07 |
| 5.50 | 8.03 | 0.06 |
| 7.08 | 8.34 | 0.08 |

Figure 7:
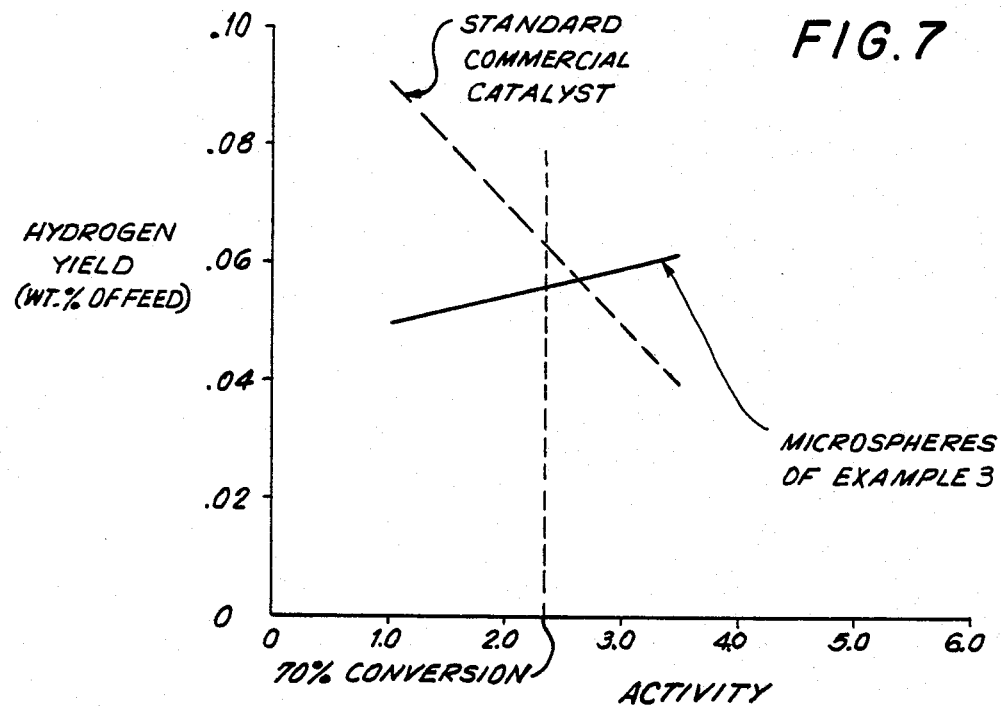
FIG. 7 shows a graph comparing hydrogen yields of a third catalyst of the present invention and of the standard commercial catalyst as a function of activity.

A graph of hydrogen yield against activity for both the microspheres of this example and for standard commercial catalyst is shown in FIG. 7. The lines that were drawn in the Figure were obtained by calculating the first order least square fit for each set of applicable data recorded in Tables III and V and then drawing lines based on those calculations. As can be seen from FIG. 7, at 70% conversion (an activity of 2.33) the hydrogen yields of the microspheres of this example and of standard commercial catalyst were about 0.05 wt. % and about 0.06 wt. %, respectively.

Figure 8:
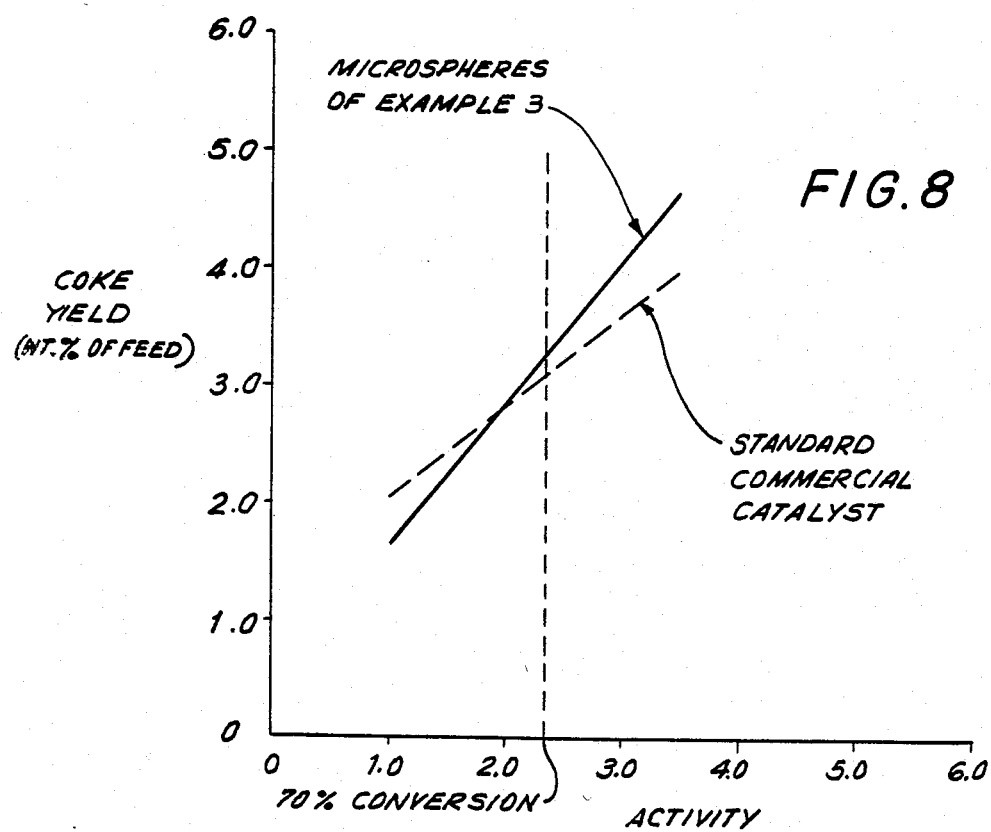
FIG. 8 shows a graph comparing coke yields of a third catalyst of the present invention and of the standard commercial catalyst as a function of activity.

A graph of coke yield against activity for both the microspheres of this example and for standard commercial catalyst is shown in FIG. 8. The lines that were drawn in the Figure were obtained by calculating the first order least square fit for each set of applicable data recorded in Tables III and V and then drawing a line based on those calculations. At 70% conversion the coke yields of the microspheres of this example and standard commercial catalyst were about 3.2 wt. % and about 3.1 wt. %, respectively.

The stability of the microspheres of this example in the presence of nickel and vanadium was determined by depositing 3940 ppm of vanadium and 1925 ppm of nickel on 220 g. (on a volatile free basis) of the microspheres using the procedure described in Example 1 and then determining the deactivated activity of the metals contaminated microspheres.

The microspheres of this example, with the metals deposited on them, had a deactivated activity of 2.45 which was 2.6 times the deactivated activity of the metals contaminated standard commercial catalyst. The severely deactivated activity of the metals contaminated microspheres of this example was 2.2 times that of metals contaminated standard commercial catalyst.

EXAMPLE 4

Microspheres comprising a mixture of metakaolin and kaolin clay that has been calcined to contain a substantial amount of mullite were prepared by the following procedure:

880 g. of Satintone ® No. 2 calcined kaolin clay (a commercially available finely divided kaolin clay that has been calcined substantially to metakaolin described in the Engelhard Technical Bulletin entitled "Aluminum Silicate Pigments" identified above) was calcined in an electrically heated furnace for seven hours at a chamber temperature of 2200° F. to convert the clay into a product having a mullite content of about 60% by weight. The preceding process was repeated for several batches of 880 g. of Satintone ® No. 2. The calcined clay was pulverized by passing it two times through a Mikro Pulverizer ® (manufactured by Pulverizing Machinery Co., Summit, N.J.) equipped with a 0.02" slotted screen.

A slurry was prepared by mixing 6500 g. of calcined clay made by the procedure described in the preceding paragraph, 6500 g. of ASP ®600 hydrous kaolin clay, 569 g. of N ®Brand sodium silicate solution, and 9800 g. of water. The mixture was spray dried in a 5 foot diameter centrifugally atomizing spray dryer under the following conditions: air inlet temperature=1070° F.; air outlet temperature=330° F.; atomizer wheel speed=19,600 rpm. A one inch bed of the spray dried microspheres was calcined in a muffle furnace for 3 hours at a chamber temperature of 1375° F. to convert the hydrous kaolin in the microspheres to metakaolin. This calcination procedure was repeated until all the microspheres had been calcined to convert the hydrous clay in them into metakaolin.

A mixture containing amorphous zeolite initiator was prepared by the following procedure:

A solution, A, was prepared by mixing 176.0 g. of sodium silicate solution (14.8% by weight $Na_2O$, 28.6% by weight $SiO_2$, 0.1% by weight $Al_2O_3$) and 26.7 g. of $H_2O$. A solution, B, was prepared by mixing 121.8 g. of sodium aluminate solution (12.4% by weight $Na_2O$, 3.91% by weight $Al_2O_3$) and 55.5 g. of a NaOH solution (25.36% by weight NaOH). Solutions A and B were heated and mixed with each other by the same procedure that solutions A and B were heated and mixed together in Example 1.

The above procedure was repeated four additional times. Each resulting mixture was covered and aged quiescently for about 6 hours at 100° F. Each aged mixture was clear.

The following ingredients were added to an 18 liter Pyrex ® kettle reactor configured for reflux operation:
- 1830 g. of the mixture containing amorphous zeolite initiator prepared above
- 8865 g. of N ®Brand sodium silicate
- 998 g. of NaOH solution containing 25.4% by weight NaOH
- 3817 g. of $H_2O$
- 1011 g. of the calcined clay microspheres The above ingredients were added to the reactor, in order, with stirring. The ingredients were heated to 210°–214° F. to initiate the crystallization reaction and maintained at that temperature, with stirring, for 12.5 hours.

The microspheres with zeolite crystallized in them were separated from their mother liquor by vacuum filtration on three, 18.5 cm. diameter Buchner funnels. The microspheres were washed with $H_2O$ and dried at about 150° F. overnight.

The dried microspheres weighed about 1500 g. and contained 59% by weight Y-faujasite zeolite having a crystalline unit cell size of about 24.70 ®.

The dried microspheres were then ion exchanged with ammonium ions by the following procedure:

At room temperature, 1500 g. of the microspheres were added to 3000 g. of a stirred solution of $NH_4NO_3$ (containing 27% by weight $NH_4NO_3$). The resulting slurry was adjusted to a pH of 3.5 with $HNO_3$ and heated to and maintained at 180° F. to achieve ion exchange in a batch process. After 1 hour at 180° F., the slurry was vacuum filtered and the microspheres were washed with about 1500 g. of $H_2O$. The washed microspheres were dried for about 24 hours at room temperature.

The dried microspheres were transferred to a 4 liter Pyrex ® vacuum Erlenmeyer flask. About 3500 g. of 27% by weight $NH_4NO_3$ solution at a pH of about 3.2–3.5 was added to the microspheres to fill the flask to within about ½ inch of its side arm. The mixture was stirred at a rate sufficient to suspend the solids, but slow enough to leave an essentially clear layer of solution above the suspended solids in the neck of the flask. After heating to 180° F., additional 27% by weight $NH_4NO_3$ at a pH of about 3.2–3.5 was pumped slowly into the bottom of the flask. About 31,500 g. of the additional $NH_4NO_3$ solution was added over about 13 hours to achieve ion exchange in a continuous process. Spent $NH_4NO_3$ solution, essentially free of solids, was allowed to leave the flask through the side arm during the continuous process.

After the continuous exchange, the slurry was vacuum filtered, the microspheres were washed with $H_2O$ and the washed microspheres were dried overnight.

The dried microspheres were then added to 2200 g. of a solution containing 27% by weight of $NH_4NO_3$, with stirring. The resulting slurry was adjusted to a pH of 3.5 with $HNO_3$ and heated to 180° F. After one hour at 180° F., the slurry was vacuum filtered and the microspheres were washed with $H_2O$.

The procedure described in the preceding paragraph was repeated an additional three times. The resulting microspheres contained 0.3% by weight $Na_2O$.

The ammonium ion containing microspheres were then ion exchanged with rare earth ions as follows:

At room temperature, the microspheres were added to 2256 g. of $H_2O$, with stirring. 451.3 g. of a mixed rare earth chloride solution (containing the equivalent of about 19.7% by weight $La_2O_3$, 6.4% by weight $Nd_2O_3$, and 0.1% by weight of each of $CeO_2$, $Sm_2O_3$, and $Pr_6O_{11}$) were added to the slurry of microspheres and $H_2O$. The pH of the resulting slurry was adjusted to 3.4 with $HNO_3$. The slurry was then heated to 180° F. After one hour at 180° F., the slurrry was vacuum filtered and the microspheres were washed with $H_2O$ and dried overnight at room temperature.

The dried microspheres were added to 2200 g. of $H_2O$ at room temperature, with stirring. To this was added 20.3 g. of the mixed rare earth chloride solution described in the preceding paragraph. The pH of the slurry was adjusted to 3.3 with $HNO_3$. The slurry was heated to 180° F. After one hour at 180° F., the slurry was vacuum filtered and the microspheres were washed with $H_2O$ and dried overnight at room temperature.

The microspheres were then added to 2265 g. of $H_2O$ at room temperature, with stirring. To this was added 41.1 g. of the mixed rare earth chloride solution described in this example. The pH of the slurry was adjusted to 3.3 with $HNO_3$. The slurry was then heated to 180° F. After one hour at 180° F., the slurry was vacuum filtered and the microspheres were washed with $H_2O$ and dried overnight at room temperature.

The sample was then ion exchanged with ammonium ions as follows: At room temperature, the microspheres were added to 2176 g. of a solution containing 27% by weight $NH_4NO_3$, with stirring. The pH of the slurry was 4.8. The slurry was then heated to 180° F. After about ½ hour at 180° F., the slurry was vacuum filtered. The microspheres were washed with $H_2O$ and dried at room temperature overnight.

A final ion exchange with rare earth ions was then conducted as follows: At room temperature, the microspheres were added to 2120 g. $H_2O$. To this was added 385 g. of the mixed rare earth chloride solution described in this example. The pH of the slurry was adjusted to 3.3 with $HNO_3$. The slurry was heated to 180° F. After one hour at 180° F., the slurry was vacuum filtered. The microspheres were washed with $H_2O$ and dried overnight at room temperature.

The microspheres (includng both the zeolitic and non-zeolitic components) contained 0.25% by weight $Na_2O$ and 7.2% by weight REO and had a $SiO_2/Al_2O_3$ molar ratio of about 2.38 (53.5% by weight $SiO_2$ and 38.1% by weight $Al_2O_3$, both on a volatile free basis).

The microspheres had 0.02 cc/g. of pores having diameters in the range of 20–100 Å, 0.07 cc/g. of pores having diameters in the range of 100–600 Å, 0.12 cc/g. of pores having diameters in the range of 600–20,000Å, a total porosity of 0.20 cc/g., a surface area of 430 $m^2/g$ and a bulk density of the 200/270 mesh fraction of 1.16 g/cc.

The EAI of the microspheres was 0.37%/sec. The EAI of the microspheres of this example was, therefore, 1.4 times that of standard commercial catalyst.

The deactivated and severely deactivated activities of the microspheres of this example were 6.50 and 3.63, respectively. The deactivated activity value is the average of three separate activity determinations made on three samples that had been hydrothermally deactivated, separately, under the appropriate conditions. The severely deactivated activity value is the average of four separate activity determinations that were made on four samples that had been hydrothermally deactivated, separately, under the appropriate conditions. The deactivated activity of the microspheres of this example, therefore, is 2.4 times that of standard commercial catalyst and the severely deactivated activity of the microspheres of this example, therefore, is 2.4 times that of standard commercial catalyst.

In addition to hydrothermally deactivating quantities of the microspheres of this example for four hours at 1450° and 1500° F., four separate portions of those microspheres were hydrothermally deactivated for four hours at 1550° F. The activity of a sample of each of those portions was determined by the ASTM standard procedure.

The hydrogen and coke yields that were obtained in the series of ASTM microactivity tests on the microspheres of this example were determined by the procedures described in Example 1. The results of those determinations are recorded in Table VI below.

TABLE VI

| Activity of Microspheres of Example 4 | Coke Yield of Microspheres of Example 4 (wt. %) | Hydrogen Yield of Microspheres of Example 4 (wt. %) |
| --- | --- | --- |
| 1.74 | 2.26 | 0.03 |
| 1.75 | 1.94 | 0.02 |
| 1.84 | 2.28 | 0.03 |
| 1.93 | 2.09 | 0.02 |
| 3.17 | 4.38 | 0.01 |
| 3.33 | 4.29 | 0.03 |
| 3.54 | 5.01 | 0.03 |
| 4.49 | 5.12 | 0.04 |
| 5.56 | 7.86 | 0.04 |
| 6.78 | 8.32 | 0.05 |
| 7.17 | 8.80 | 0.05 |

Figure 9:
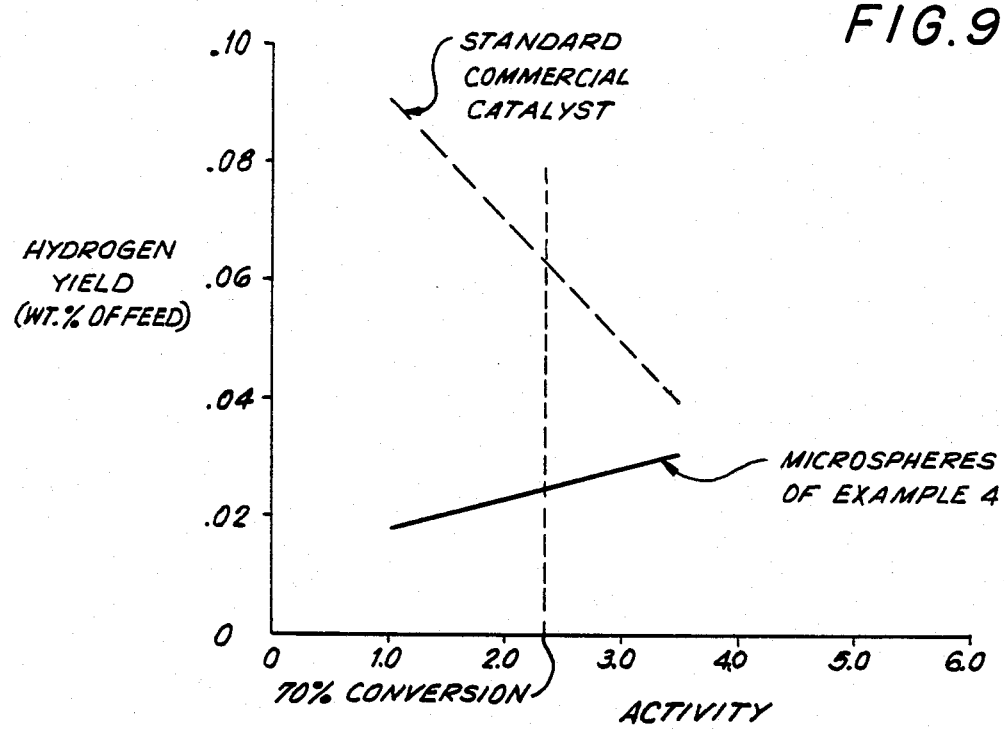
FIG. 9 shows a graph comparing hydrogen yields of a fourth catalyst of the present invention and of the standard commercial catalyst as a function of activity.

A graph of hydrogen yield against activity for both the microspheres of this example and for standard commercial catalyst is shown is FIG. 9. The lines that were drawn in the Figure were obtained by calculating the first order least square fit for each set of applicable data recorded in Tables III and VI and then drawing lines based on those calculations. As can be seen from FIG. 9, at 70% conversion (an activity of 2.33) the hydrogen yields of the microspheres of this example and of standard commercial catalyst were about 0.03 wt. % and about 0.06 wt. %, respectively.

Figure 10:
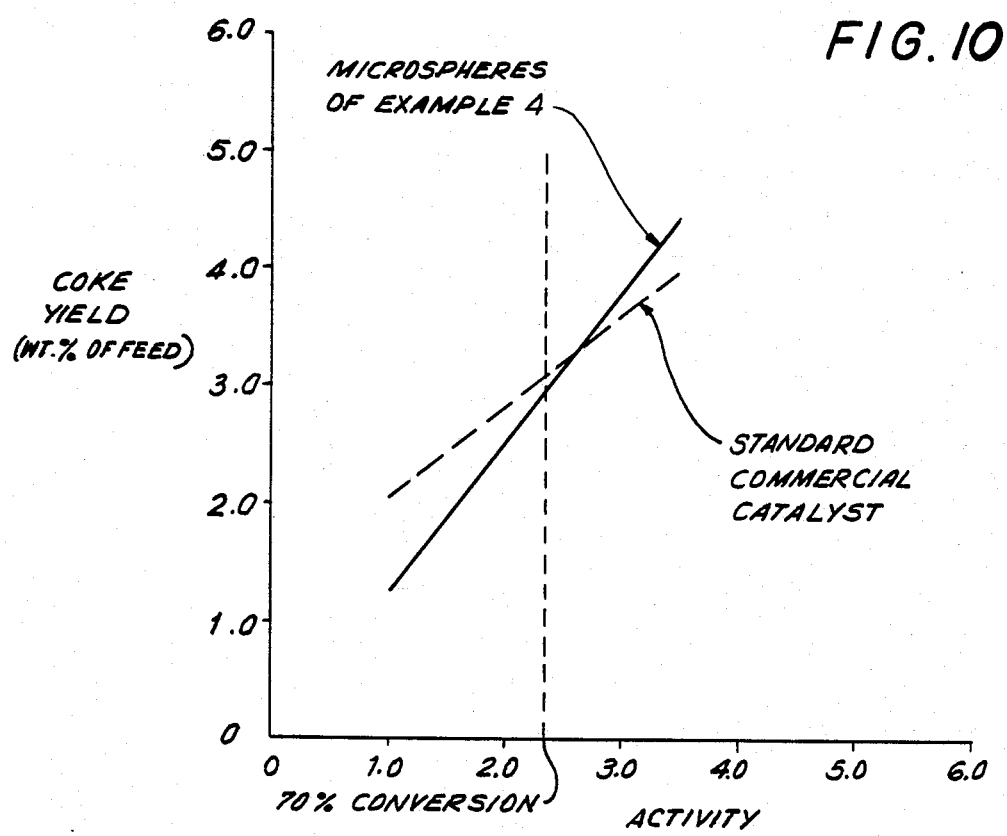
FIG. 10 shows a graph comparing coke yields of a fourth catalyst of the present invention and of the standard commercial catalyst as a function of activity.

A graph of coke yield against activity for both the microspheres of this example and for standard commercial catalyst is shown in FIG. 10. The lines that were drawn in the Figure were obtained by calculating the first order least square fit for each set of applicable data recorded in Tables III and VI and then drawing lines based on those calculations. At 70% measured conversion the coke yields of the microspheres of this example and standard commercial catalyst were about 3.0 wt. % and about 3.1 wt. %, respectively.

The stability of the microspheres of this example in the presence of nickel and vanadium was determined by depositing 4260 ppm of vanadium and 2260 ppm of nickel on 210 g. (on a volatile free basis) of the microspheres using the procedure described in Example 1 and then determining the deactivated activity of the metals contaminated microspheres.

The microspheres of this example, with the metals deposited on them, had a deactivated activity of 1.23 which was 1.3 times the deactivated activity of the metals contaminated standard commercial catalyst. The severely deactivated activity of the metals contaminated microspheres of this example was 0.6 times the severely deactivated activity of the metals contaminated standard commercial catalyst.

EXAMPLE 5

This example illustrates the crystallization of more than 40% by weight Y-faujasite in microspheres derived from calcined clay comprising a mixture of metakaolin and kaolin clay that cas calcined substantially through its characteristic exotherm without any substantial formation of mullite, in which the two types of calcined clay are in separately formed microspheres.

The microspheres of calcined clay that were used in this example were obtained from a supply of those microspheres at an Engelhard facility. We do not know the precise conditions under which those microspheres were made. We believe that the microspheres of calcined clay were made from microspheres of hydrous clay that were made by a process of the type described in U.S. Pat. No. 3,663,165 (Example 1, col 6, lines 44–57). The microspheres of calcined clay that were calcined substantially through the characteristic exotherm were made by calcining the hydrous microspheres under appropriate conditions (e.g., for 2 hours in a muffle furnace at a chamber temperature of 1800° F.). Similarly, the microspheres of metakaolin were made by calcining the microspheres of hydrous clay under appropriate conditions (e.g., for 2 hours in a muffle furnace at a temperature of 1350° F. ).

A mixture containing amorphous zeolite initiator was prepared by the following procedure:

A solution, A, was prepared by mixing 179 g. of sodium silicate solution (14.8% by weight $Na_2O$, 28.6% by weight $SiO_2$, 0.1% by weight $Al_2O_3$) and 28.7 g. of $H_2O$. A solution, B, was prepared by mixing 76.8 g. of sodium aluminate solution (13.1% by weight $Na_2O$, 3.76% by weight $Al_2O_3$) and 29.1 g. of a NaOH solution (25.4% by weight NaOH). Solutions A and B were heated and mixed with each other by the same procedure that Solutions A and B were heated and mixed together in Example 1. The resulting mixture was then covered and aged quiescently for about 6 hours at 100° F. The aged mixture was clear.

The following ingredients were added to a one liter Pyrex ® kettle reactor configured for reflux operation:
- 122 g. of the aged amorphous zeolite initiator solution
- 529 g. of N ® Brand sodium silicate
- 365.6 g. of NaOH solution made from 23.6 g. of NaOH pellets and 342 g. of $H_2O$
- 67.4 g. of calcined clay microspheres (a one-one mixture of the two types of calcined clay microspheres described above)

The above ingredients were added to the reactor, in order, with stirring. The ingredients were heated to 210°–214° F. to initiate the crystallization process and maintained at that temperature, with stirring, for 20 hours.

The microspheres with zeolite crystallized in them were separated from their mother liquor by vacuum filtration on an 11 cm. diameter Buchner funnel. The microspheres were washed with $H_2O$ and dried at room temperature.

The dried microspheres contained 44% by weight Y-faujasite zeolite having a crystalline unit cell size of about 24.67Å.

The microspheres had 0.08 cc/g. of pores having a diameters in the range of 20–100Å, 0.02 cc/g. of pores having diameters in the range of 100–600Å, 0.03 cc/g. of pores having diameters in the range of 600–20,000Å, a total porosity of 0.13 cc/g., and a surface area of 345 $m^2/g$.

EXAMPLE 6

This example illustrates the preparation of microspheres of the catalyst of the present invention in which: (a) the non-zeolitic component of the microspheres was derived from a mixture of metakaolin and clay that was calcined through its characteristic exotherm without any substantial formation of mullite in which the two types of calcined clay were present in the same microspheres; (b) the clay that was calcined through the characteristic exotherm was made from ASP ®900 hydrous clay (a commercially available hydrous kaolin clay described in the Engelhard Technical Bulletin entitled "Aluminum Silicate Pigments" identified above); and (c) the zeolite crystallization process was internally seeded with a mixture containing amorphous zeolite initiator. We believe that the use of ASP ®900 hydrous clay to make the clay that was calcined through the characteristic exotherm in this example results in a product having a better EAI than would have been obtained had Satintone ® No. 1 been used as the clay that was calcined through its characteristic exotherm (as was done in the internally seeded process described in Example 3).

A mixture containing amorphous zeolite initiator was prepared on a commercial scale by the following procedure:

9,752 Kg. of sodium silicate solution (containing about 27.5% by weight $SiO_2$ and about 14.7% by weight $Na_2O$) and 8,593 Kg. of sodium aluminate solution (containing about 3.0% by weight $Al_2O_3$ and 14.0% by weight $Na_2O$) were simultaneously pumped, over a period of about fifteen minutes, into a 45,400 liter tank which already contained 24.5 Kg. of sodium silicate solution (containing about 27.5% by weight $SiO_2$ and about 14.7% by weight $Na_2O$) and 777 Kg. of $H_2O$. The solution was mixed and heated, using steam coils. After initial mixing, 312 Kg. of a solution containing 47.8% by weight NaOH and 717 Kg. of additional water were added. After a warm-up time of approximately six hours during which the temperature of the solution was raised from 74° F. to 100° F., the solution was kept at 100° F. for 22 hours with intermittent mixing (i.e., the solution was mixed for 5 minutes every four hours). A small quantity of the resulting mixture, containing amorphous zeolite initiator, was then removed from the tank and stored at room temperature for 12 days before being used. The mixture was cloudy when it was used.

880 g. of ASP ®900 hydrous kaolin clay was calcined in a muffle furnace for one hour at a chamber temperature of 2000° F. to calcine the clay through its characteristic exotherm without any substantial formation of mullite. The preceding calcination process was repeated for several batches of 880 g. of ASP ®900 hydrous kaolin clay. The calcined clay was pulverized by passing it two times through a Mikro Pulverizer ® of the type described in Example 4.

A slurry was prepared by mixing 1500 g. of the calcined kaolin prepared in the preceding paragraph, 1500 g. of ASP ®600 hydrous kaolin, 1285.9 g. of the mixture containing amorphous zeolite initiator described above, and 4000 g. of deionized $H_2O$. The slurry was spray dried in a Bowen Model No. 1 fountain nozzle spray drier of the type described in Example 3 under the following conditions: counter current air flow; inlet air pressure = 19 psi; inlet air temperature = 707° F.; outlet air temperature = 338° F.

A 1½ inch bed of the spray dried microspheres was calcined in a muffle furnace for two hours at a chamber temperature of 1350° F. to convert the hydrous kaolin in the microspheres to metakaolin. This procedure was repeated until all the microspheres had been calcined to convert the hydrous clay to metakaolin. Each tray containing a bed of microspheres was taken out of the muffle frunace after the first hour of calcination, rotated 180°, and placed back into the furnace for the second hour of calcination.

The following ingredients were added to a 7 liter Pyrex ® kettle reactor configured for reflux operation:
  5340 g. of sodium silicate solution containing 15.1% by weight $Na_2O$, 28.4% by weight $SiO_2$ and 0.1% by weight $Al_2O_3$
  363.6 g. of N ®Brand sodium silicate
  2636.4 g. of $H_2O$
  1200 g. of the calcined clay microspheres.

The first sodium silicate solution above was a concentrated mother liquor by-product produced during the manufacture of an Engelhard commercial catalyst.

The above ingredients were added to the reactor, in order, with stirring. The resulting slurry had a molar ratio of $H_2O/Na_2O$ in the solution phase of about 24, a weight ratio of $SiO_2$ in the solution phase to microspheres of calcined clay of about 1.35 and a molar ratio of $Na_2O/SiO_2$ in the solution phase of about 0.50. The slurry was heated to 209°–211° F. to initiate the crystallization process and was maintained at that temperature, with stirring, for 21 hours.

The microspheres with zeolite crystallized in them were separated from their mother liquor by vacuum filtration on two 18.5 cm diameter Buchner funnels. The microspheres were washed with $H_2O$.

The microspheres were then washed with two liters of acetone, dried on the vacuum filter for 4 hours and dried in air for 2–3 hours. The dried microspheres weighed about 1943 g. and contained about 57% by weight Y-faujasite zeolite having a crystalline unit cell size of about 24.71Å.

The dried microspheres were then ion exchanged with ammonium ions by the following procedure:

At room temperature, the microspheres were added to 2915 g. of a stirred solution of $NH_4NO_3$ (containing 27% by weight $NH_4NO_3$) that had been adjusted to a pH of 3.0 with $HNO_3$. The resulting slurry was adjusted to a pH of 3.0 with $HNO_3$ and heated to 180° F. The slurry was maintained at 180° F. for ½ hour to achieve ion exchange in a batch process. After ½ hour at 180° F., the slurry was vacuum filtered, and the microspheres were washed with $H_2O$. The entire procedure was repeated for a total of 10 batch exchanges. After the 10th exchange, the microspheres were washed with water, dried on the vacuum filter for 30 minutes and then dried at room temperature for 1 day. The resulting microspheres had an $Na_2O$ content of 0.39% by weight.

An ion exchange with rare earth ions was then conducted as follows: A mixed rare earth chloride solution was prepared by mixing 490 g. of a concentrated mixed rare earth chloride solution (containing the equivalent of about 18.4% by weight $La_2O_3$, 6.3% by weight $Nd_2O_3$, 1.4% by weight $CeO_2$, 0.9% by weight $Pr_6O_{11}$ and 0.3% by weight $Sm_2O_3$) with 1985 g. of $H_2O$. The pH of the solution was adjusted to 3.2 with $HNO_3$. At room temperature, the ammonium ion exchanged microspheres were added to the solution containing rare earth chlorides, with stirring. After the microspheres were added, the pH was adjusted to 3.2 with $HNO_3$. The slurry was heated to 180° F. and kept at that temperature, with stirring, for 15 minutes. The slurry was then vacuum filtered and the microspheres were washed with $H_2O$. The microspheres were dried on the vacuum filter for 30 minutes and then dried at room temperature for 1 day.

The microspheres (including both the zeolitic and non-zeolitic components) contained 0.34% by weight $Na_2O$ and 7.30% by weight REO and had an $SiO_2/Al_2O_3$ molar ratio of 2.85 (59.5% by weight $SiO_2$ and 35.4% by weight $Al_2O_3$, both on a volatile free basis).

The microspheres had 0.07 cc/g. of pores having diameters in the range of 20–100Å, 0.03 cc/g. of pores having diameters in the range of 100–600Å, 0.004 cc/g. of pores having diameters in the range of 600–20,000Å, a total porosity of 0.09 cc/g., a surface area of 500 m²/g. and a bulk density of the 200/270 mesh fraction of 1.12 g/cc.

The EAI of the microspheres was 0.41%/second. The EAI of the microspheres of this example, therefore, was about 1.5 times the EAI of standard commercial catalyst.

What is claimed is:

1. A fluid catalytic cracking catalyst comprising microspheres containing at least about 40% by weight Y-faujasite and having less than about 0.20 cc/g. of pores having diameters in the range of 20–100Å, said microspheres having the following characteristics:
   (a) a deactivated activity at least about 1.5 times that of standard commercial catalyst;
   (b) a severely deactivated activity at least about 1.5 times that of standard commercial catalyst;
   (c) a coke yield no greater than about that of standard commercial catalyst at 70% conversion; and
   (d) an EAI no more than about 5.0 times that of standard commercial catalyst.

2. The fluid catalytic cracking catalyst of claim 1 wherein the microspheres have the following characteristic: a hydrogen yield no greater than about that of standard commercial catalyst at 70% conversion.

3. The fluid catalytic cracking catalyst of claim 1 wherein the microspheres have at least about the deactivated activity of standard commercial catalyst when about 4000 ppm of vanadium and about 2000 ppm of nickel are deposited on both catalysts.

4. The fluid catalytic cracking catalyst of claim 1 wherein the microspheres have the following characteristics:
(a) a deactivated activity at least about 2.0 times that of standard commercial catalyst;
(b) a severely deactivated activity at least about 2.0 times that of standard commercial catalyst; and
(c) an EAI no more than about 3.0 times that of standard commercial catalyst.

5. The fluid catalytic cracking catalyst of claim 1 wherein the microspheres have about 1.5 times the deactivated activity as compared to standard commercial catalyst when about 4000 ppm of vanadium and about 2000 ppm of nickel are deposited on both catalysts.

6. The fluid catalytic cracking catalyst of claim 1 wherein the microspheres have no more than about 3.0 times the EAI of standard commercial catalyst.

7. The fluid catalytic cracking catalyst of claim 1 wherein the microspheres have no more than about 1.5 times the EAI of standard commercial catalyst.

8. The fluid catalytic cracking catalyst of claim 1 wherein the microspheres contain a non-zeolitic component comprising the zeolite crystallization process residue of calcined clay, said calcined clay comprising about 30–60% by weight metakaolin and about 40–70% by weight kaolin clay that had been calcined at least substantially through its characteristic exotherm.

9. The fluid catalytic cracking catalyst of claim 8 wherein the two types of calcined clay were present in the same microspheres and the kaolin clay that had been calcined at least substantially through its characteristic exotherm contained a substantial amount of mullite.

10. The fluid catalytic cracking catalyst of claim 8 wherein the two types of calcined clay were present in the same microspheres and said kaolin clay that had been calcined at least substantially through its characteristic / exotherm contained substantially no mullite.

11. The fluid catalytic cracking catalyst of claim 8 wherein the microspheres contain about 50–70% by weight Y-faujasite.

12. The fluid catalytic cracking catalyst of claim 11 wherein the two types of calcined clay were present in the same microspheres.

13. The fluid catalytic cracking catalyst of claim 1 wherein the microspheres contain about 50–70% by weight Y-faujasite.

14. The fluid catalytic cracking catalyst of claim 13 wherein the Y-faujasite, in the sodium form, has a crystalline unit cell size of less than about 24.73Å.

15. The fluid catalytic cracking catalyst of claim 14 wherein the microspheres have the following characteristic: a hydrogen yield no greater than about that of standard commercial catalyst at 70% conversion.

16. The fluid catalytic cracking catalyst of claim 1 wherein the Y-faujasite, in the sodium form, has a crystalline unit cell size of less than about 24.69Å.

17. The fluid catalytic cracking catalyst of claim 1 wherein the microspheres have less than about 0.15 cc/g. of pores having diameters in the range of 20–100Å.

18. The fluid catalytic cracking catalyst of claim 1 wherein the microspheres contain less than about 0.7% by weight $Na_2O$, more than about 4% weight REO, and have a $SiO_2/Al_2O_3$ molar ratio of about 1.7–3.4.

19. The fluid catalytic cracking catalyst of claim 18 wherein the microspheres contain about 50–70% by weight Y-faujasite having, in its sodium form, a unit cell size of less than about 24.73Å.

20. The fluid catalytic cracking catalyst of claim 19 wherein the microspheres have less than about 0.15 cc/g. of pores having diameters in the range of 20–100Å, less than about 0.20 cc/g. of pores having diameters in the range of 600–20,000Å, a surface area of about 400–750$m^2$/g., and a bulk density of the 200/270 mesh fraction of about 0.9–1.2 g/cc.

21. The fluid catalytic cracking catalyst of claim 1 wherein the microspheres have a total porosity of less than about 0.15 cc/g.

22. The fluid catalytic cracking catalyst of claim 1 wherein the microspheres have a total porosity of less than about 0.10 cc/g.

23. The fluid catalytic cracking catalyst of claim 14 wherein the microspheres have a total porosity of less than about 0.15 cc/g.

24. A fluid catalytic cracking catalyst comprising microspheres containing more than about 40% by weight Y-faujasite, less than about 0.7 by weight $Na_2O$, more than about 4% by weight REO, and having a $SiO_2/Al_2O_3$ molar ratio of about 1.7–3.4, less than about 0.20 cc/g. of pores having diameters in the range of 20–100Å, less than about 0.30 cc/g. of pores having diameters in the range of 600–20,000Å, a surface area of about 300–750$m^2$/g. and a bulk density of the 200/270 mesh fraction of about 0.8–1.2 g/cc., said microspheres comprising:
(a) a non-zeolitic component comprising the zeolite crystallization process residue of calcined clay, said calcined clay comprising about 30–60% by weight metakaolin and about 40–70% by weight kaolin clay that had been calcined at least substantially through its characteristic exotherm; and
(b) Y-faujasite having, in the sodium form, a crystalline unit cell size of less than about 24.73Å.

25. The fluid catalytic cracking catalyst of claim 24 wherein the microspheres have the following characteristics:
(a) a deactivated activity at least about 1.5 times that of standard commercial catalyst;
(b) a severely deactivated activity at least about 1.5 times that of standard commerical catalyst;
(c) a coke yield no greater than about that of standard commercial catalyst at 70% conversion; and
(d) an EAI of no more than about 5.0 times that of standard commercial catalyst.

26. The fluid catalytic cracking catalyst of claim 25 wherein the microspheres have the following characteristic: a hydrogen yield no greater than about that of standard commercial catalyst at 70% conversion.

27. The fluid catalytic cracking catalyst of claim 25 wherein the EAI of the microspheres is no more than about 3.0 times that of standard commercial catalyst.

28. The fluid catalytic cracking catalyst of claim 25 wherein the EAI of the microspheres is no more than about 1.5 times that of standard commercial catalyst.

29. The fluid catalytic cracking catalyst of claim 24 wherein the two types of calcined clay were present in the same microspheres and the kaolin clay that had been calcined at least substantially through its characteristic exotherm contained a substantial amount of mullite.

30. The fluid catalytic cracking catalyst of claim 24 wherein the two types of calcined clay were present in the same microspheres and the kaolin clay that had been calcined at least substantially through its characteristic exotherm contained substantially no mullite.

31. The fluid catalytic cracking catalyst of claim 25 wherein the two types of calcined clay were present in the same microspheres.

32. The fluid catalytic cracking catalyst of claim 24 wherein the microspheres contain about 50–70% by weight Y-faujasite.

33. The fluid catalytic cracking catalyst of claim 24 wherein the Y-faujasite, in the sodium form, has a crystalline unit cell size of less than about 24.69Å.

34. The fluid catalytic cracking catalyst of claim 24 wherein the microspheres contain more than about 7% by weight REO and less than about 0.5% by weight $Na_2O$.

35. The fluid catalytic cracking catalyst of claim 24 wherein the microspheres have a total porosity of less than about 0.15 cc/g.

36. The fluid catalytic cracking catalyst of claim 24 wherein the microspheres have less than about 0.15 cc/g. of pores having diameters in the range of 20–100Å, less than about 0.20 cc/g. of pores having diameters in the range of 600–20,000Å, a surface area of about 400–750m$^2$/g., and a bulk density of the 200/270 mesh fraction of about 0.9–1.2 g/cc.

37. The method for making a fluid catalytic cracking catalyst comprising the steps of:
(a) forming an aqueous slurry of finely divided hydrous kaolin clay and finely divided kaolin clay that has been calcined at least substantially through its characteristic exotherm;
(b) spray drying the aqueous slurry to obtain microspheres comprising a mixture of hydrous kaolin clay and kaolin clay that has been calcined at least substantially through its characteristic exotherm;
(c) calcining the microspheres obtained in step (b) at a temperature and for a time sufficient to convert the hydrous kaolin clay in the microspheres substantially to metakaolin and to obtain microspheres of calcined clay comprising a mixture of about 30–60% by weight metakaolin and about 40–70% by weight kaolin clay that has been calcined at least substantially through its characteristic exotherm;
(d) mixing the microspheres obtained in step (c) with one or more sources of sodium silicate and water to obtain an alkaline slurry of microspheres of calcined clay in an aqueous solution containing sodium silicate, said sodium silicate being provided in an amount so that microspheres having a $SiO_2/Al_2O_3$ molar ratio of about 1.7–3.4 are obtained in step (h) below;
(e) adding zeolite initiator to the kaolin clay that has been calcined at least substantially through its characteristic exotherm before step (f) below;
(f) heating the slurry of microspheres of calcined clay to a temperature and for a time sufficient to crystallize at least about 40% by weight Y-faujasite in the microspheres, said Y-faujasite being in the sodium form;
(g) separating the microspheres containing at least about 40% by weight Y-faujasite from at least a major portion of its mother liquor;
(h) replacing sodium cations in the microspheres separated in step (g) with ammonium or rare earth cations or both.

38. The method of claim 37 wherein the clay that has been calcined at least substantially through its characteristic exotherm contains substantially no mullite.

39. The method of claim 38 further comprising conducting the following steps after step (g) and before step (h):
(i) contacting the microspheres separated in step (g) with a solution containing sodium silicate; and
(j) drying the microspheres obtained in step (i) to obtain microspheres containing sodium silicate.

40. The method of claim 38 wherein a portion of the mother liquor is left entrained in the microspheres in step (g) and further comprising conducting the following step after step (g) and before step (h):
(i) drying the microspheres separated in step (g) to obtain microspheres containing sodium silicate.

41. The method of claim 37 wherein the clay that has been calcined through its characteristic exotherm contains a substantial amount of mullite.

42. The method of claim 37 wherein the sodium silicate provided in step (d) is, at least in part, mother liquor recycled from the separating step of step (g) and the mother liquor by-product produced during the preparation of another zeolite product.

43. The method of claim 37 further comprising adding zeolite initiator to the slurry formed in step (a).

44. The method of claim 37 wherein the molar ratios of constitutents present at the beginning of the crystallization process of step (f) are:

| $Na_2O/SiO_2$ | $SiO_2/Al_2O_3$ | $H_2O/Na_2O$ |
| --- | --- | --- |
| 0.30–0.60 | 5–13 | 20–35 |

45. The method of claim 44 wherein the weight ratio of water to clay microspheres at the beginning of the crystallization process of step (f) is about 4–12.

46. The method of claim 45 wherein the molar ratio of $Na_2O/SiO_2$ in the solution phase at the beginning of the crystallization process of step (f) is about 0.49–0.57 and the weight ratio of $SiO_2$ in the solution phase to the clay microspheres at the beginning of the crystallization process of step (f) is about 1.0–1.7.

47. The method of claim 37 wherein about 50–70% by weight Y-faujasite is crystallized in the microspheres in step (f).

48. The method for making a fluid catalytic cracking catalyst comprising the steps of:
(a) making microspheres of calcined kaolin clay, said microspheres comprising about 30–60% by weight metakaolin and about 40–70% by weight kaolin clay that has been calcined at least substantially through its characteristic exotherm and containing no or no more than about 10% by weight hydrous clay;
(b) mixing the microspheres of step (a) with one or more sources of sodium silicate and water to obtain an alkaline slurry of microspheres of calcined clay in an aqueous solution containing sodium silicate, said sodium silicate being provided in an amount so that microspheres having an $SiO_2/Al_2O_3$ molar ratio of about 1.7–3.4 are obtained in step (f) below;
(c) adding zeolite initiator to the microspheres before step (d) below;

(d) heating the slurry of microspheres of calcined clay to a temperature and for a time sufficient to crystallize at least about 40% by weight Y-faujasite in the microspheres, said Y-faujasite being in the sodium form;

(e) separating the microspheres containing at least about 40% by weight Y-faujasite from at least a major portion of its mother liquor;

(f) replacing sodium cations in the microspheres separated in step (e) with ammonium or rare earth cations or both.

49. The method of claim 48 wherein the two types of calcined clay in the microspheres made in step (a) are present in the same microspheres.

50. The method of claim 48 wherein the kaolin clay that has been calcined at least substantially through its characteristic exotherm contains substantially no mullite.

51. The method of claim 50 further comprising conducting the following steps after step (e) and before step (f):

(g) contacting the microspheres separated in step (e) with a solution containing sodium silicate;

(h) drying the microspheres obtained in step (g) to obtain microspheres containing sodium silicate.

52. The method of claim 50 wherein a portion of the mother liquor is left entrained in the microspheres in step (e) and further comprising conducting the following step after step (e) and before step (f):

(g) drying the microspheres separated in step (e) to obtain microspheres containing sodium silicate.

53. The method of claim 48 wherein the clay that has been calcined through its characteristic exotherm contains a substantial amount of mullite.

54. The method of claim 48 wherein the molar ratios of constituents present at the beginning of the crystallization process of step (d) are:

| $Na_2O/SiO_2$ | $SiO_2/Al_2O_3$ | $H_2O/Na_2O$ |
| --- | --- | --- |
| 0.30–0.60 | 5–13 | 20–35 |

55. The method of claim 54 wherein the weight ratio of water to clay microspheres at the beginning of the crystallization process of step (d) is about 4–12.

56. The method of claim 55 wherein the molar ratio of $Na_2O/SiO_2$ in the solution phase at the beginning of the crystallization process of step (d) is about 0.49–0.57 and the weight ratio of $SiO_2$ in the solution phase to clay microspheres at the beginning of the crystallization process of step (d) is about 1.0–1.7.

57. The method of claim 48 wherein about 50–70% by weight Y-faujasite is crystallized in the microspheres in step (d).

58. The fluid catalytic cracking catalyst made by the method of claim 37.

59. The fluid catalytic cracking catalyst made by the method of claim 47.

60. The fluid catalytic cracking catalyst made by the method of claim 48.

61. The fluid catalytic cracking catalyst made by the method of claim 49.

62. The fluid catalytic cracking catalyst made by the method of claim 57.

* * * * *

UNITED STATES PATENT AND TRADEMARK OFFICE
CERTIFICATE OF CORRECTION

PATENT NO. : 4,493,902

DATED : January 15, 1985

INVENTOR(S) : Brown et al.

It is certified that error appears in the above-identified patent and that said Letters Patent is hereby corrected as shown below:

Prior art cover page

Under "3,515,683  6/1970  "Flank et al...252/455"
insert --3,574,538  4/1971  McDaniel et al...23/112--
under "3,994,800  11/1976  Lussier et al....208/120"
insert --4,007,253  2/1977  Puppe et al....423/329
   4,085,069  4/1978  Alafandi et al...252/455z
   4,093,560  6/1978  Kerr et al...252/455z--
Under "4,178,352  12/1979  Vaughan et al....423/329"
insert --4,198,321  4/1980  Alafandi et al....252/455z--

```
Col.  1, Line 48, "tp" should be --to--
Col.  4, Line 63, "laborator" should be --laboratory--
Col.  7, Line 23, "hearing" should be --heating--
Col.  8, Line 39, "a" should be --as--
Col.  9, Line 13, after "characteristic" insert --exotherm--
Col. 11, Line 50, after "product" insert --having--
Col. 11, Line 66, "substantially" should be --substantial--
Col. 13, Line 59, after "that" insert --a--
Col. 13, Line 64, "spary" should be --spray--
Col. 15, Line 11, "," should be --.--
Col. 17, Line 2,  after "batch" insert --was--
```

UNITED STATES PATENT AND TRADEMARK OFFICE
CERTIFICATE OF CORRECTION

PATENT NO. : 4,493,902

DATED : January 15, 1985

INVENTOR(S) : Brown et al.

It is certified that error appears in the above-identified patent and that said Letters Patent is hereby corrected as shown below:

Col. 22, Line 33, "volative" should be --volatile--
Col. 24, Line 21, delete "A"
Col. 24, Line 39, "$NH_4OH_3$" should be --$NH_4NO_3$--
Col. 30, Line 52, "®" should be --Å--
Col. 32, Line 62, "is" (second occurrence) should be --in--
Col. 33, Line 34, "cas" should be --was--
Col. 38, Line 27, "0.7" should be --0.7%--

Signed and Sealed this

Fifteenth Day of December, 1987

Attest:

DONALD J. QUIGG

*Attesting Officer*  *Commissioner of Patents and Trademarks*